US006679444B2

(12) United States Patent
Castronovo

(10) Patent No.: US 6,679,444 B2
(45) Date of Patent: Jan. 20, 2004

(54) HIGH-SECURITY DATA REMOVAL PROCESS FOR DATA-CONTAINING DISKS, PORTABLE MACHINE FOR HIGH-SPEED, HIGH-SECURITY DISK DATA REMOVAL, AND DVD SPLITTING PROCESS AND APPARATUS

(76) Inventor: Charles Castronovo, 706 Chapel Ridge Rd., Timonium, MD (US) 21093

( * ) Notice: Subject to any disclaimer, the term of this patent is extended or adjusted under 35 U.S.C. 154(b) by 239 days.

(21) Appl. No.: 09/968,537

(22) Filed: Oct. 2, 2001

(65) Prior Publication Data
US 2002/0038830 A1 Apr. 4, 2002

Related U.S. Application Data

(63) Continuation-in-part of application No. 09/516,934, filed on Mar. 1, 2000, now Pat. No. 6,334,582.

(51) Int. Cl.[7] .............................................. B02C 19/12
(52) U.S. Cl. ..................................... 241/101.2; 83/870
(58) Field of Search ........................ 101/4, 6; 451/63, 451/270, 271; 156/344; 83/870; 241/101.2

(56) References Cited

U.S. PATENT DOCUMENTS

| 2,265,649 | A | | 12/1941 | Krehbiel | |
|---|---|---|---|---|---|
| 4,509,700 | A | | 4/1985 | Svengren | |
| 5,619,898 | A | * | 4/1997 | Witt | ............................ 83/870 |
| 5,832,804 | A | * | 11/1998 | Dudley et al. | ................ 83/870 |
| 5,954,569 | A | | 9/1999 | Hutchison et al. | |
| 6,039,637 | A | | 3/2000 | Hutchison et al. | |
| 6,066,229 | A | * | 5/2000 | Komine et al. | ............. 156/344 |
| 6,189,446 | B1 | | 2/2001 | Olliges et al. | |
| 6,317,197 | B1 | * | 11/2001 | Li et al. | ........................ 355/74 |
| 6,334,582 | B1 | | 1/2002 | Castronovo | |
| 6,468,879 | B1 | * | 10/2002 | Lamure et al. | ............. 438/458 |
| 6,585,177 | B2 | | 7/2003 | Castronovo | |
| 6,588,687 | B2 | | 7/2003 | Castronovo | |
| 2002/0008168 | A1 | | 1/2002 | Castronovo | |
| 2003/0006325 | A1 | | 1/2003 | Castronovo | |

OTHER PUBLICATIONS

U.S. patent application Ser. No. 09/954,269, Castronovo, filed Oct. 18, 2001.
Proton Engineering Inc. Literature, Jul. 22, 1999.
DX–CDm™ Destruction Device Literature, undated.
DX–Cde CD Destruction Device Literature, undated.

* cited by examiner

Primary Examiner—Mark Rosenbaum
(74) Attorney, Agent, or Firm—Whitham, Curtis & Christofferson, P.C.

(57) ABSTRACT

The data destruction machine is a desk-top, portable unit with a short (under 10 second) cycle time, pluggable into a wall outlet. Upon insertion of a disk (such as a CD or split DVD) into the machine, which is fully automatic, data is removed. The machine converts the data-storage layer into residue consistent with security destruction standards from which no data is retrievable. A single machine may be used for declassifying CDs and split DVDs. Splitting DVDs in preparation for inserting them into the data destruction machine may be accomplished quickly and simply.

7 Claims, 15 Drawing Sheets

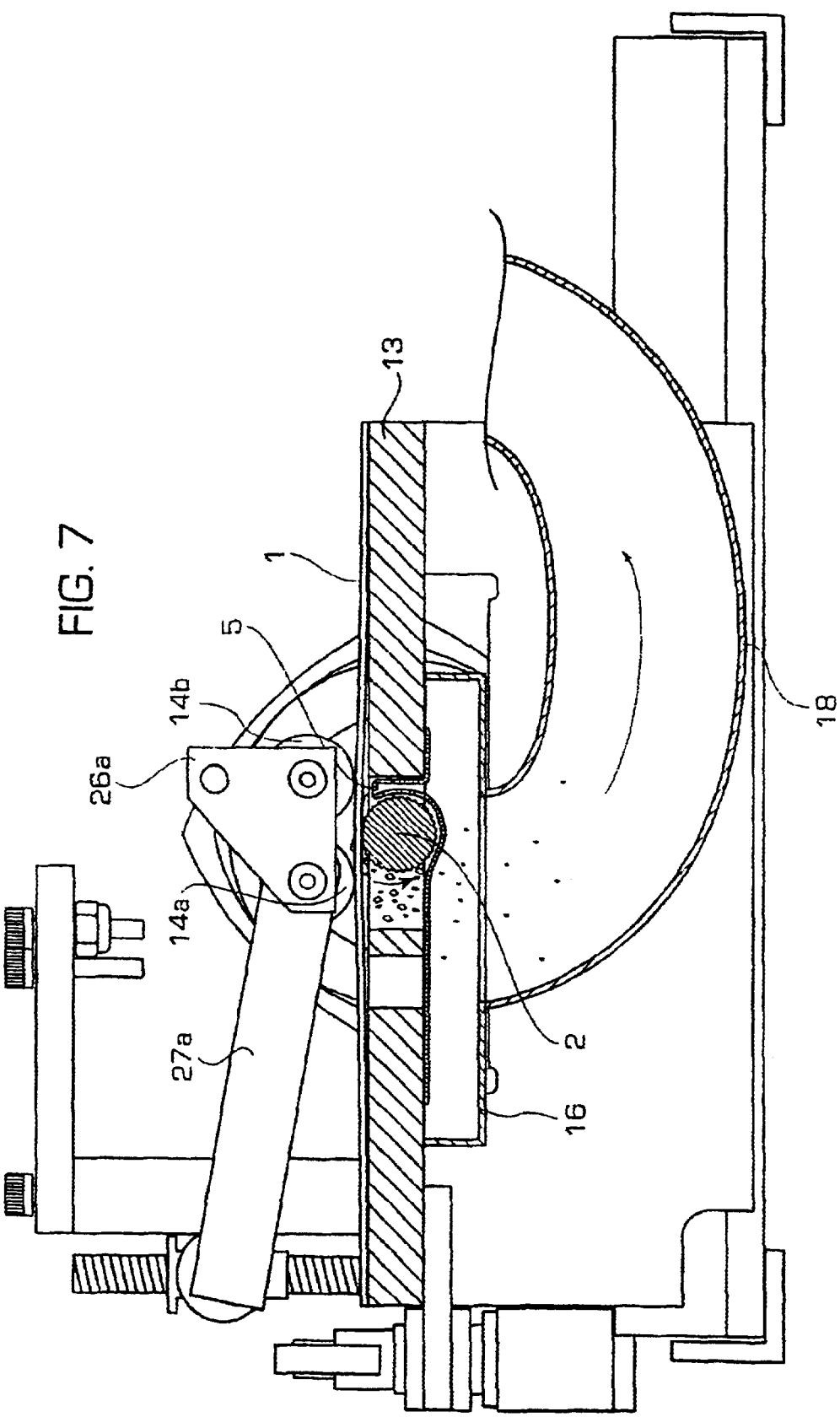

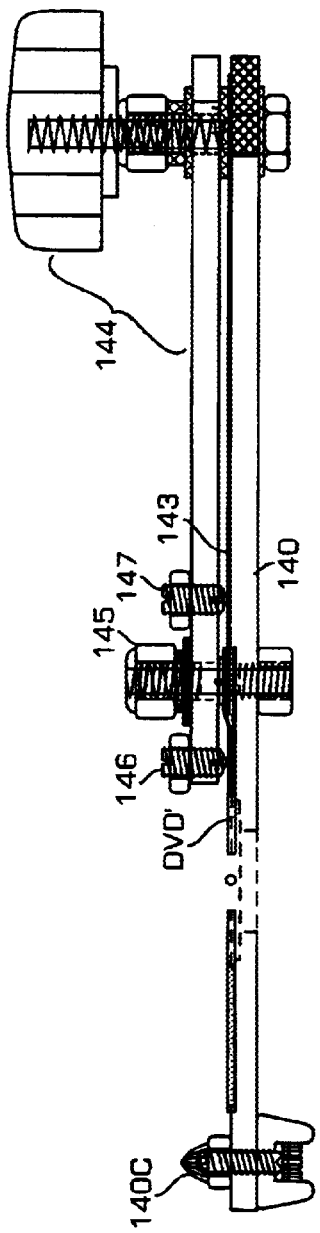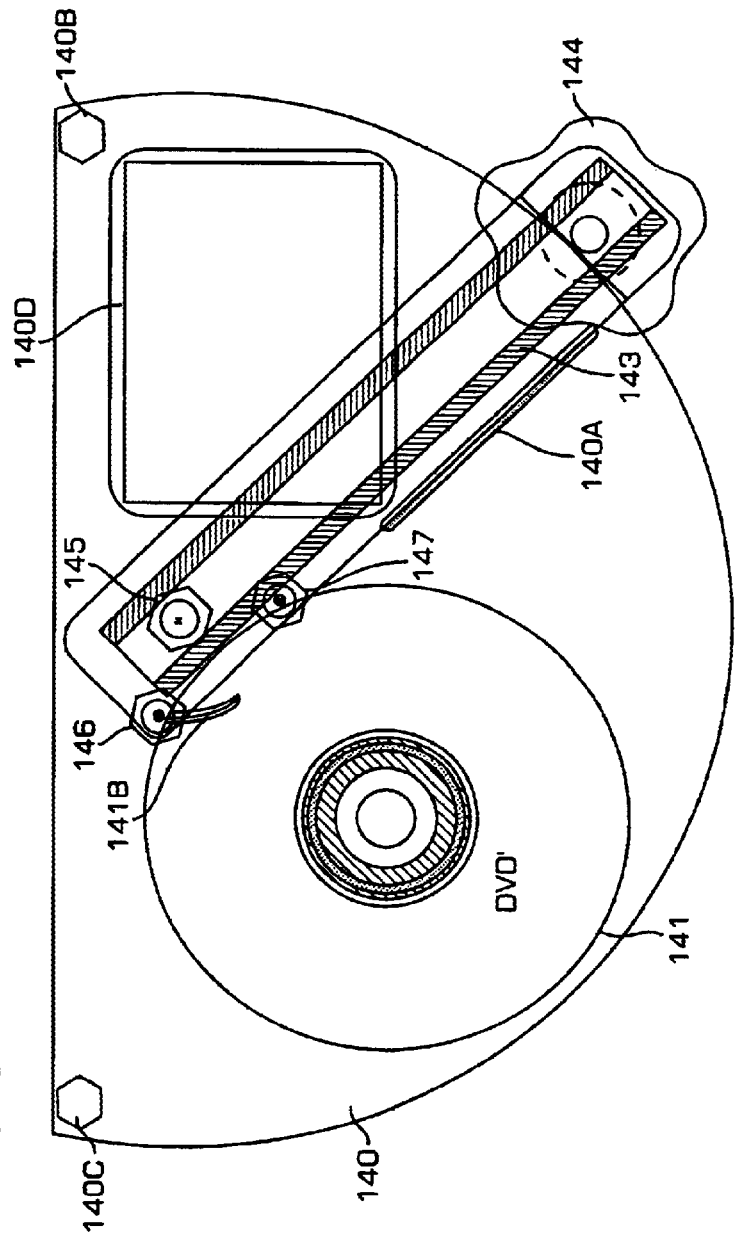
FIG. 13C
FIG. 13B

HIGH-SECURITY DATA REMOVAL PROCESS FOR DATA-CONTAINING DISKS, PORTABLE MACHINE FOR HIGH-SPEED, HIGH-SECURITY DISK DATA REMOVAL, AND DVD SPLITTING PROCESS AND APPARATUS

RELATED APPLICATION

This is a continuation-in-part of application Ser. No. 09/516,934 filed Mar. 1, 2000 (now patented, U.S. Pat. No. 6,334,582).

FIELD OF THE INVENTION

This invention relates to high-security removal of data from information bearing disks, especially high-security removal of data from ordinary CDs, CDRs, CDRWs and DVDs.

BACKGROUND OF THE INVENTION

Compact disks (CDs) include three types: ordinary CDs, CDRs and CDRWS. These disks store data in little pits burned into the disk, or optically in a very thin light-sensitive dye layer on the disk. The information is stored in a very thin layer under the label. That stored information theoretically can be scraped off into small enough pieces so that the data cannot be read. That is, the data can be mechanically disintegrated. CDRs are also known as WORMs, i.e., Write Once Read Many. Relatively speaking, for different kinds of CDs, high-security-grade deletion or erasure of data from CDRs is the most difficult to accomplish. CDRWs are the modern equivalent of floppy disks. Actual writing is by a laser, and the stored data is covered by a metallized reflective layer which is the back side of the label. Rewriteables tend to have the reflective label come off in flakes. Also, there is a remote possibility that a mirror image of the data might come off with the label. Flakes are big enough fragments that such data might still be read. Ordinary CDs, CDRs and CDRWs are sometimes collectively referred to herein as CDs. DVDs (digital versatile disks, also previously known as "digital video disks") are almost exactly the same thickness, diameter, and general shape as CDs and in many ways resemble CDs. Generally a disk can be determined to be a DVD by the edge having a central seam or joint between the two halves.

DVDs are manufactured somewhat like a sandwich, with an extremely thin reflective layer and one or two extremely thin layers of a special light-sensitive dye in the middle, located between the two thick clear plastic covers. A "double-sided" DVD can hold twice as much data as the equivalent-type "single-sided" DVD.

A "single-sided" DVD consists of a thick clear plastic cover, an extremely thin dye layer, an extremely thin reflective layer and a thick clear plastic cover. The read/write laser "looks through" and "shoots through" the clear plastic towards the data layer and finally the reflector layer, from ONE side.

A "double-sided" DVD consists of a thick clear plastic cover, an extremely thin dye layer, an extremely thin reflective layer which is reflective on both sides, an extremely thin dye layer, and a thick clear plastic cover. The read/write laser "looks through" and "shoots through" the clear plastic towards the data layer and finally the reflector layer from EITHER side, thus providing double storage capacity.

Currently, in the year 2001, the highest commercially available DVD ("double-sided") capacity is about 9.4 gigabytes, with even higher capacity DVD's on the horizon. The highest capacity CD is currently about 0.8 gigabytes. With their vastly superior storage capacity one can only conclude that DVD's will become increasingly popular.

Destruction of data from such CDs and DVDs may be further complicated by the fact that particular manufacturers may use different adhesive systems, with some systems more prone to flaking upon removal of the data layer. Thus, flaking is a variable problem for which provision must be made, but which is not easily solved, when undertaking data removal.

In certain applications, erasing or removing sensitive data from disks can be critical for security reasons or necessary for business reasons. As devices for putting information onto disks such as CDs and DVDs are becoming more common, so, too, the problem of how to effectively remove that stored information from the disks is becoming even more of a concern.

Certain devices for performing such data erasure are known, but respectively suffer from drawbacks.

For example, Proton Engineering Inc. has a declassification system that is a CD-ROM Eraser/Declassifier, for CD-ROMS, WORM CDs and other optical media, that according to its literature reportedly declassifies CD-ROMS in 12 seconds. It is a mini-tower of 18"×18"×9", 75 lbs, and its power requirements are 120 vac. 50/60 Hz., 8 amperes. Another example of a known data-erasure device is SEM's model 1200 weighing 75 lbs. The DX-CDE CD destruction device is 59.4 lbs, 24" high, 7.5" in diameter, weighing 50 lbs. with electrical operation. These declassification machines, weighing 75 lbs, almost 60 lbs and 50 lbs, disadvantageously are relatively heavy and not easily portable. A further example is the DX-CDm™ CD Destruction Device, which is a manual field portable unit that is intended for mounting on the inside wall of a vehicle, bracketed to the side of a vessel, or securely fastened to the bulkhead of an ocean going vessel. The machine is 20 lbs, 10" high, of 7" diameter. The inner hub of the erased disk remains intact. The machine operates by mechanical operation with a rotating handle. Although this declassification machine is relatively light-weight, 30 seconds is the operating time, which may be disadvantageously long. In addition, this machine disadvantageously MUST be firmly secured to a robust mounting surface, because considerable force is exerted on the rotary handle to operate it. Further this machine disadvantageously requires considerable manual effort, resulting in rapid operator fatigue, and consequent difficulty in performing the critically important high-security-grade removal of data.

Another conventional device that purports to provide secure CD destruction is that of U.S. Pat. No. 6,039,637 to Hutchison et al. (issued Mar. 21, 2000) for "Security device for destroying the information bearing layer and data of a compact disc."

Another example of a device that purports to provide secure CD destruction is that of U.S. Pat. No. 6,189,446, to Olliges et al. (issued Feb. 20, 2001) is for a "System for the secure destruction of compact disc data." Olliges discloses a system for use on gold or aluminum information bearing surfaces (IBS's), especially those of CDs but also mentioning DVDs. Olliges et al.'s system includes at least one pair of rollers, with each roller rotatably mounted between rigid support plates. A CD passes between the rollers under pressure. The roller exteriors contain raised patterns. After passing through the roller system, the disk is said to be characterized by lines of distortion that are about 0.25 mm apart. Olliges et al. attempts to distort a CD sufficiently to prevent a laser from reading information stored in groove-like patterns, by distorting the shape of pits in which data were stored, moving pits from their original positions, displacing the reflective layer of the CD at the base of the pits so that the laser beam does not reflect back properly to the optical sensor, "filling in" the pits, and production of imperfections. Such a method that leaves data on the disk is subject to drawbacks, such as the fact that there may be technology, now or developed in the future, for making sense of the remains. Especially where so much data is all in one place (e.g., still on the one disk), Olliges et al.'s methods may be risky.

A commercial example of such a machine is the Security Engineered Machinery (SEM) Model 1250B. Examination of the results of the operation of this machine reveals that it disadvantageously leaves considerable contiguous recorded information, easily visible under an ordinary microscope, on the disk. Thus it disadvantageously does not perform the high-security data removal to Dept. of Defense standards, or even common-sense industrial security standards.

Another consideration introduced into this data destruction area is that in many applications the declassified disk cannot be entirely destroyed, because verification of declassification is needed for the particular exact original disk. Such verification is accomplished by a data destruction method that retains only the disk's inner-hub which bears its identifying information, such as a serial number. A method which destroys the entire disk does not permit this verification of destruction.

There is a need, which has not heretofore been met, for a data erasure machine that declassifies data-containing disks such as CDs and DVDs that meets the following characteristics: short (e.g., less than 10 seconds) cycle time; small size (e.g., such as 10×12×8 inches); pluggable into a wall outlet; light-weight (e.g., less than about 20 lbs); mechanically simple; and, capable of destroying all confidential data on the disk while maintaining intact only the inner hub of the disk, so that the serial number or identifying disk number remains visible to confirm data destruction on the original product. Also, high-security destruction of data stored on a disk is extremely important to government, military, and commercial users. Especially considering the large amount of data that can be stored on a solitary DVD, and the likelihood that DVD use will be increased, high-security data destruction suited to DVDs is a particular concern.

SUMMARY OF THE INVENTION

After much evaluation by the inventor of potential ways to remove and handle stored material on information bearing disks such as CDs and DVDs, including evaluating cutting, grinding and destroying the whole disk, the present inventor arrived at the following inventive products for removing data from disks while leaving the inner-hub data intact and further arrived at the following inventive methods and machines. Also, the invention advantageously provides for easy removal of data from CD's (wherein the data is on one side, at the surface), by a device or apparatus into which can be fed a split DVD (wherein the data is also on one side at the surface), so that all type of CDs (CDs, CDRs, CDRWs and DVDs) can be processed with a single data destruction device or apparatus.

The invention in a first preferred embodiment provides a method for security declassification of a disk (such as an ordinary CD, a CDR, a CDRW, a DVD etc.), comprising the step of contacting a data-containing disk with a rotating cutter having a patterned surface to provide a declassified disk. In one embodiment of the invention, the contacting step provides dust; in another embodiment, the contacting step provides dust and flakes. Where flakes are provided, the invention provides for further reducing the flakes to dust. In a particularly preferred embodiment of the invention, the contacting step is performed for about 3–10 seconds. In an especially preferred embodiment of the invention, the disk is rotating while the cutter is contacting the disk. In a particularly preferred embodiment of the invention, the rotating cutter is provided in a desk-top, portable machine pluggable into a wall outlet.

Additionally, the invention in a second preferred embodiment provides a high-security, high-speed disk declassification machine, comprising a patterned-surface cutter, wherein the cutter is of length about corresponding to the exterior data band of a disk; a motor connected to the cutter for rotating the patterned-surface cutter at 10,000–30,000 rpm; and a system for capturing and positioning the disk to press the rotating patterned-surface cutter parallel to the disk with the cutter length aligned with a disk external data radius for sweeping the disk external data surface.

In a third preferred embodiment, the invention provides a high-security, high-speed disk declassification machine, comprising: a patterned-surface cutter; a motor connected to the cutter for rotating the patterned-surface cutter at 10,000–30,000 rpm; and a system for capturing and positioning a batch of disks comprising CDs and split DVDs to press the rotating patterned-surface cutter parallel to the disk with the cutter length aligned with a disk exterior ring radial length for sweeping the disk external data surface.

In a fourth preferred embodiment, the invention provides a production method for minimizing the size and weight of a high-speed CD or DVD-disk declassification motorized machine to as small as about 8 inches by 10 inches by 12 inches and as light as about 17 pounds, comprising the steps of: (A) providing a housing of about 8 inches high, with a base of about 10 by 12 inches, and having an opening on a side into which a CD or split DVD may be inserted; (B) in the housing interior, securely disposing a system for capturing and positioning a CD or split disk, such that the capturing/positioning system is secured to the housing base; (C) mechanically connecting to the capturing/positioning system, a system for disposing a patterned-surface cutter of length about 1.52 inches with the cutter parallel to and below where the CD or split DVD will be held by the capturing/positioning system for cutting, with the cutter length aligned with the CD or DVD exterior data band radial width; and (D) to the cutter, connecting a motor for rotating the cutter at 10,000–30,000 rpm. The most preferred embodiment of such a production method provides a CD or DVD declassification machine that outputs a verifiable center-ring-intact declassified CD or DVD.

In a fifth preferred embodiment, the invention provides a DVD splitter system, comprising: a housing with a circular nest of diameter only slightly larger than a DVD diameter, the nest having a height of about half the thickness of a DVD; and a blade attached to the housing.

In a sixth preferred embodiment, the invention provides a method for security declassification of a disk having at least one interior information-bearing surface, comprising (a) lengthwise-splitting the to-be-split disk into a number of thinner split-disk fragments; and, (b) contacting each interior surface of the split-disks with a rotating cutter having a patterned surface to provide a declassified disk surface. In a most preferred exemplary method, the to-be-split disk is a DVD, and the DVD is split into two DVD halves each of about ½ thickness of the to-be-split DVD. In an especially preferred embodiment of the invention, the cutter has a length equal to or about corresponding to an exterior data ring radial length of the disk. In another especially preferred embodiment, before splitting the DVD, each exterior face of the to-be-split disk is marked with a marking that directs contact of the split disk with the rotating cutter.

In a seventh preferred embodiment, the invention provides a high-security, high-speed DVD declassification machine, comprising: a patterned-surface cutter; a motor connected to the cutter for rotating the patterned-surface cutter at 10,000–30,000 rpm; and a system for capturing and positioning a lengthwise split half-DVD to press the rotating patterned-surface cutter parallel to the DVD surface with the cutter length aligned with a disk exterior ring radial length for sweeping the disk external data surface. An especially preferred embodiment includes a cutter of length about corresponding to the exterior data ring radial length of a disk. Another particularly preferred embodiment includes a housing having disposed therein the cutter, with a DVD splitter device detachably contacting an exterior surface of the housing.

In an eighth preferred embodiment, the invention provides a digital versatile disk (DVD) comprising at least one interior surface onto which information has been recorded or is recordable, and including on an exterior of the DVD a marking directing entry of the DVD into a data destruction machine. In an especially preferred embodiment, the marking has been applied before information-recording onto the interior surface.

Some further details of the inventive methods, machines, apparatuses, devices and processes are as follows, without the invention being limited thereto.

In a particularly preferred embodiment of the invention, the declassified disk has an intact center ring (such as an intact center ring comprising disk identifying information). In a particularly preferred embodiment, the cutter has a length equal to or about corresponding to an exterior data band of the disk, and preferably the cutter length exceeds the exterior data band. In a particularly preferred embodiment of the invention, a disk is declassified in as little as 3–6 seconds, to provide products consisting essentially of a declassified disk with intact center-ring and security-standard dust.

In a particularly preferred embodiment of the invention, the cutter may be cylindrical shaped. The cutter rotation may be provided by a motor. The patterned cutter surface preferably comprises a pattern selected from the group consisting of a rotary file, herring bone, cross-cut rotary file, intersecting spiral and non-cross-cut interleave file, most preferably a cross-cut herringbone pattern. The cutter diameter preferably may be about ½ inch. In a particularly preferred embodiment of the invention, the cutter is operated at about 10,000–30,000 rpm.

The cutter may be driven by a motor run on a timing cycle (such as a timing cycle initiated by an arm-actuated microswitch). In a preferred embodiment of the invention, the microswitch is triggered by the disk before the contacting step. A particularly preferred embodiment of the invention provides a machine wherein the cutter-driving motor is on a timing cycle controlled by a microswitch, wherein the cycle is triggered on by a disk being inserted past the microswitch's actuator arm. A particularly preferred embodiment of the invention provides for (1) disposing a microswitch system comprising a microswitch such that the microswitch is positioned with respect to the opening into which the disk is inserted to detect entry of a disk into the housing; and (2) electrically connecting the microswitch to a timing circuit and disposing the timing circuitry in the housing interior.

In an especially preferred embodiment of the invention, dust is vacuum-collected, such as by a dust collection system for collecting dust formed when the cutter contacts the disk. In a particularly preferred embodiment, the dust collection system comprises a vacuuming system positioned near the cutter and a dust collection bag connected to the vacuuming system. Another preferred embodiment provides for disposing a motorized vacuum dust collection system in the housing interior. The motorized vacuum dust collection system may comprise a motor separate from the cutter motor. The motorized vacuum dust collection system may comprise a dust collection bag connected to a vacuum exhaust which is connected to a vacuuming device directed to vacuum dust from where the cutter contacts the disk.

In a further especially preferred embodiment of the invention, flakes are captured. Flake capturing preferably comprises providing a screen disposed near the rotating patterned cutter. In a most preferred embodiment, the invention further comprises further cutting the captured flakes into dust. An inventive machine preferably may comprise a means for flake collection (such as a screen) disposed near the cutter. A particularly preferred embodiment of the invention provides for shaping and positioning a flake-capturing screen under the cutter and close to the cutter without contacting the cutter and also under the CD or DVD support, and to completely block access by flakes to the vacuum dust collection bag.

In an especially preferred embodiment of the invention, a vacuum system is applied to hold the disk in contact with the rotating cutter having a patterned surface. In a further embodiment, the disk is held in contact with the patterned cutter surface entirely by the vacuum system.

In another particularly preferred embodiment of the invention, the system for capturing and positioning the disk comprises a spring-loaded pinch roller. In a further embodiment, the pinch roller comprises a pinch roller (driven by a motor), squeezing the disk against a ball bearing. The system for capturing and positioning the disk may comprise a means for rotating the disk being declassified. The means for rotating the disk being declassified may comprise a roller mechanism.

Additionally, in another embodiment of the invention, the system for capturing and positioning the disk may comprise ball bearings against which the disk to be declassified rests, such as three ball bearings positioned in a triangle with one ball bearing positioned on a pressure arm which captures the disk to position for holding and rotating. In another embodiment, the system for capturing and positioning the disk comprises a pivot with a non-rotating guidepost at the bottom of the pivot, wherein the guidepost is located exactly across from the center of the roller. Also, in a particularly preferred embodiment of the invention, the disk capturing/positioning system comprises a platform of about 6 inches wide by 5½ inches long for supporting the disk during high-speeding cutting (such as a platform having a minimized cut-out section for the cutter under the disk to contact the disk data surface).

Where a pinch roller is used, a further preferred embodiment provides a brush for brushing the pinch roller. Also, the pinch roller may be easily replaceable. In an exemplary embodiment, the capturing/positioning system comprises a motorized pinch roller system in which the pinch roller is positioned above and in close contact with the CD or DVD, and there is a pinch roller motor separate from the cutter motor and separate from the vacuum motor.

In a preferred embodiment, the motorized pinch roller system further comprises a brush disposed above the pinch roller with the brushing end contacting the pinch roller.

In a particularly preferred embodiment, the invention provides multi-disk processing, such as a data declassification machine comprising a multi-disk processing system.

SUMMARY OF THE DRAWINGS

FIG. 7 shows a flake-trapping screen in relation to the cutter.

FIG. 13B is top view, x-ray style, of a splitter. FIG. 13C is a cross-sectional view of the splitter of FIG. 13B in operation showing a DVD partially split.

DETAILED DESCRIPTION OF THE PREFERRED EMBODIMENTS

Figure 1:
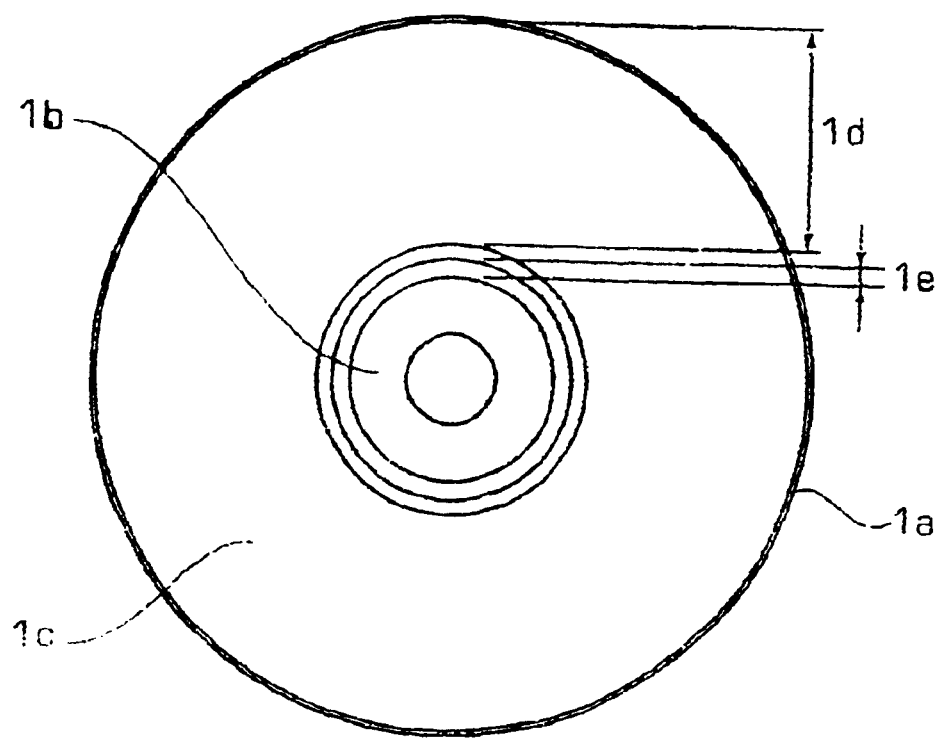
FIG. 1 is a top view of a standard CD showing the respective surface areas for the data area and the serial number.
Figure 14A:
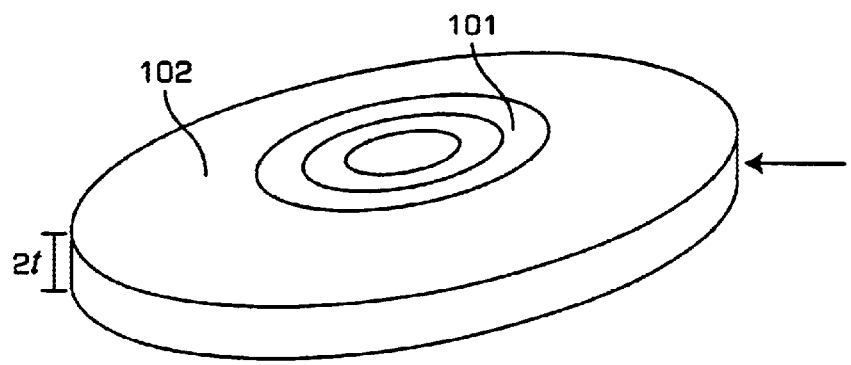
FIG. 14A is a perspective view of a DVD before being split with an arrow showing an exemplary place on the DVD at which the DVD may be split according to the invention.
Figure 14B:
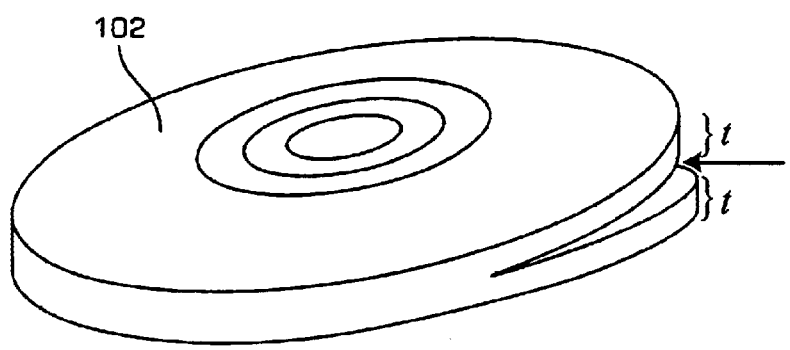
FIG. 14B is a perspective view of a partly-split DVD.
Figure 14C:
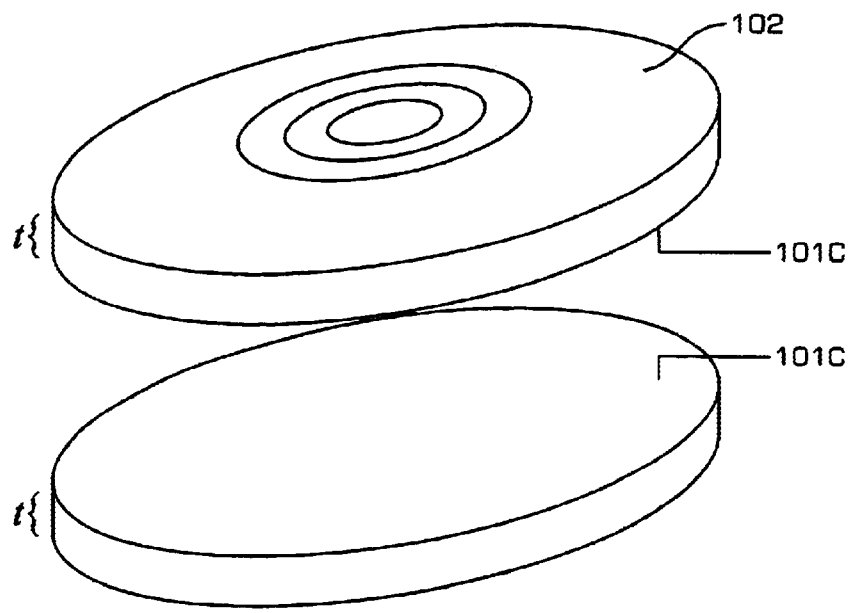
FIG. 14C shows two pieces of a DVD after being split according to the invention.

Before being processed according to the invention, a disk (such as a CD or DVD) 1 encoded with data, referring to FIG. 1, has a circumferential edge 1*a*, a center ring 1*b*, a shiny top surface 1*c*, and a data area 1*d* under the shiny top surface 1*c*. The inner center-ring 1*b* of the disk is essentially data-less, usually having a serial or control number for identifying the disk but no confidential information. About the exterior 1.52 inches of the radius of the disk, the outer band 1*d* of the disk has recorded information. Herein that data-containing part of the disk sometimes is referred to as the disk "exterior data band". Serial number area 1*e* shown in FIG. 1 and FIGS. 14 is typical of where a serial number may appear on the disk. In the case of a DVD, as may be appreciated from FIGS. 14A–14C, there may be two data areas 101*c*.

The desired "declassifying" of the disk means that the processed disk and any remaining dust and particles meet the U.S. government NSA/DOD declassification standard. Declassifying the disk may be accomplished in one aspect of the invention by a process in which the unprocessed disk 1 is contacted with a rotating cutter with a patterned surface. By the action of the patterned rotating cutter, the data area of the disk is forcibly removed from the disk in the form of particles sufficiently small to meet security destruction standards. The disk that is subjected to such a declassification procedure may be a CD, a DVD, or a DVD that has been split in half. If a DVD is split before declassification, the same piece of equipment may be used, without adjustment, for declassifying a CD or a split DVD.

Because a DVD carries its data in the middle of the disk (see FIGS. 14B–14C), the most expeditious way to remove the data from a DVD is to expose this middle portion of the DVD disk (so that the removal process may be applied), by splitting the disk into two disk-shaped halves (see FIG. 14C), to split DVD of thickness 2*t* (see FIG. 14A) to half-DVD of thickness t (see FIGS. 14B, 14C). In this fashion, the DVD data may be exposed and then contacted with a rotating cutter according to the invention and the data may be removed from the DVD half-disk, while the clear plastic covers (such as plastic cover 102 on FIGS. 14A–B) remain.

For splitting a DVD, optimally the DVD is subjected to application of force at its rim at half of its thickness, as shown in FIG. 14A. Any force application that splits the DVD into two essentially equal disks of half-thickness may be used, with application of a blade being particularly preferred.

Figure 13A:
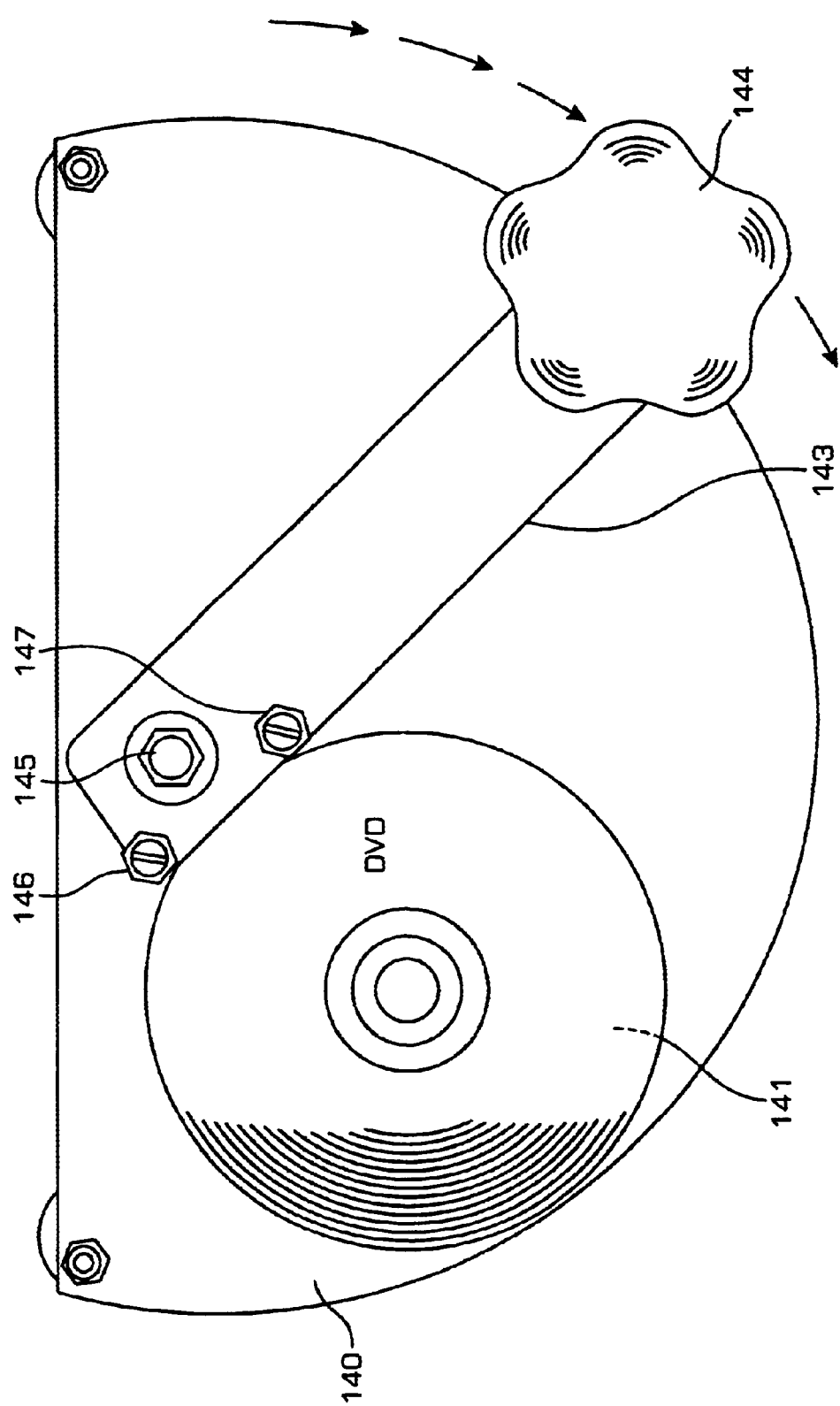
FIG. 13A is a top view of a splitter according to the invention, with a to-be-split DVD nested in the splitter.

During force application to the DVD, preferably the DVD is situated in a holding device that avoids manual holding of the DVD. An exemplary DVD-holder and device for application of splitting force is shown in FIG. 13A. A body 140 is provided, with a circular nesting spot 141 that is just slightly larger in diameter than a DVD to accommodate a DVD and is sized for a relatively snug fit. Preferably, the height of the nest is half the thickness of a DVD, minus an appropriate allowance for the thickness and style of the blade 143. A blade 143 is provided so that a corner of the blade may be forcibly contacted with the midline of the circumferential edge of the DVD to start the splitting action on the DVD. Considerable force is required to start the splitting action, and this is facilitated by the high operating leverage (over 7:1 in a preferred embodiment) designed into the machine. Once the initial split is started, finishing the complete split is much easier, and is accomplished with little or no leverage. An example of a blade 143 is a 0.028" thick ordinary "steel-rule die" material, well known in the materials cutting art. In a preferred embodiment, the blade is ground sharp on both long edges, and is dimensioned, along with other elements of the device, so that when the first edge is worn or damaged, the blade may be removed and turned end-for-end, allowing the second edge to be used. In a preferred embodiment, the blade 143 is sharpened with a single bevel, to provide a simpler, lower-precision mechanism, needing no adjustments during manufacture or use. The blade 143 preferably is flat, such as a flat 1" wide blade. The blade 143 also preferably is beveled at its cutting edge, most preferably a bevel which aids in the splitting aid (such as a long bevel, which provides a gradual wedging/ slicing entry). A blade also preferably may be two-sided, such as a two-sided beveled blade, thus providing a "spare" blade edge.

As shown in FIG. 13A, a handle 144 guards the operator from coming in contact with the blade. The blade 143 and its associated handle 144 are secured to the housing 140 by a pivot 145. The blade 143 is shown in a starting position in FIG. 13A. The pivot 145 permits the blade 143 to be swung away from the DVD (i.e., counterclockwise in FIG. 13A) and towards the DVD (i.e., clockwise in FIG. 13). The particular arrangement in FIG. 13 A is preferable for a right-handed operator; a left-handed splitter arrangement may be easily adapted therefrom. The DVD is manually loaded into the nest 141 and the operator holds the DVD in the nest with one hand while moving the handle 144 to activate the blade 143 and split the DVD.

In a preferred embodiment (as illustrated in FIG. 13A) the splitting device may be fitted with two ball-nosed spring-loaded plungers 146 and 147. The two small locknuts for these plungers are shown in FIG. 13A. The outer plunger 146 contacts the disk prior to the blade 143 contacting the disk, and holds the edge of the disk down during the initial (first phase) penetration by the corner of the blade 143 (counter-clockwise (CCW) handle 144 rotation). The ball-nose style of plunger is preferable, because it tends to roll across the disk surface under pressure, rather than slide and drag across it. This ball-nose plunger feature makes overall operation easier. During clockwise (CW) handle 144 rotation (secondary and final penetration) the inner plunger 147 contacts the disk prior to the blade 143, and holds the edge of the disk down during the beginning of penetration. During this second phase, the blade enters at the small starting split formed during the first phase, and the blade contacts the disk much nearer the midpoint of the blade edge.

In a preferred embodiment (as illustrated in FIGS. 13A, 13B), the end of the handle 144 is fitted with a knob which is free to rotate, enhancing operator ease, comfort, safety, and convenience. An exemplary example of using a DVD splitting device, such as the device of FIG. 13B, is to follow the following operation sequence. First, marking of each side of the to-be-split DVD is carried out, such as by using a felt-tip writing marker or crayon, marking EACH side of the to-be-split DVD "TOP" or "UP". Such a marking step is highly preferred, as the markings indicate which side should face in which direction (for example, which side faces up) when each half-DVD is inserted into a high-security disk data removal machine. It is especially preferred that the to-be-split DVD be marked immediately prior to splitting and data destruction. It will be appreciated that the marking should correspond to the configuration of data destruction to be subsequently used. For example, both sides of a to-be-split DVD may be marked "TOP" when they are to be inserted into a data removal machine in which the rotating cutter is underneath the to-be-classified disk. Marking to be placed on the DVD may vary depending on the configuration of the rotating cutter, disk insertion system, etc. When a split DVD has not been marked, or where a split DVD has markings the accuracy of which may be doubted, it is suggested to apply the cutting surface against both sides of the split DVD, to ensure that the information bearing surface has contacted the cutting surface. Preferably the DVD-splitting apparatus or device includes a receptable or attachment containing at least one marker, such as a pouch containing at least one marker, at least one clipped-on marker, at least one marker on an extendible cord, etc.

Optionally, the disks, destruction devices and machines according to the invention may be marked, such as with directive markings and/or instructions, so that the inventive methods, apparatuses and devices may be used by operators having relatively little skill, knowledge or training. It will be appreciated that a DVD-marking method advantageously reduces the data destruction time by minimizing the number of non-information-bearing-surfaces that are contacted with a data-destroying cutter. Additionally, pre-marking of DVDs and/or CDs may be provided, such as pre-marking DVDs during manufacture with appropriate marking to correspond to a particular data destruction apparatus. When DVDs are pre-marked during disk manufacture, preferably a notation also is included to the effect that the DVD must be split, such as a marking "when split, 'TOP' for certain listed models", such "when split, 'TOP' for Datastroyer." A corresponding instruction may be prominently included on the data destruction machine, such as "split DVDs before insertion".

The to-be-split DVD having been marked or confirmed to be marked, referring again to FIG. 13B, next, the handle 144 is moved to the "start" position, by lining up the handle 144 with the thick black line 140A. The handle 140 is shown in the "start" position in FIG. 13B. The disk is then loaded into the circular nest 141. (Half of the disk falls below the main flat machine surface.)

While the operator holds the disk down firmly with his or her left hand, the operator with his or her right hand moves the handle 144 counterclockwise (CCW) (towards the instruction label 140D) to the stop 140B. This movement causes the end-corner of the sharp blade 143 to just slightly penetrate the disk edge, in the middle, making a starting-point for the splitting operation. The blade end-corner penetrates the disk about ¼".

Ball plunger 146 also inscribes a small arc-shaped mark 141B on the top surface of the disk, at the edge.

Figure 13D:
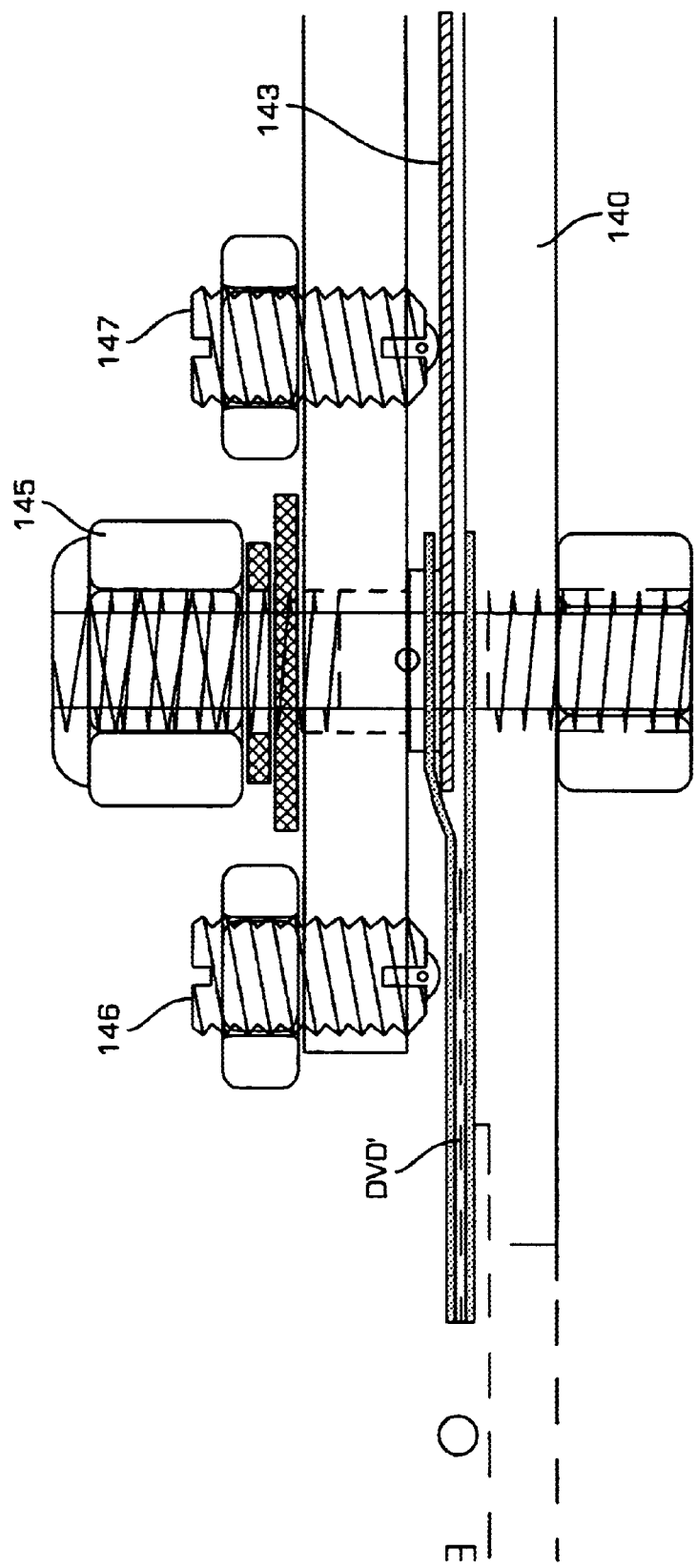
FIG. 13D is a magnified view of part of FIG. 13C.

Handle 144 is returned to the start position. Then the disk DVD' is rotated about 15 degrees clockwise so that the small arc-shaped mark 141B just made at the edge of the disk lines up with the inner small nut 147 on the handle 140. This positioning establishes a set-up in which blade 143 can enter at the point started on the disk DVD' in the above-mentioned penetration. Holding the disk down steady, the operator swings the handle 140 clock-wise (away from the label 140D) all the way to the stop 140C. The blade passes through the midline of the disk, completely splitting it. FIG. 13C (and FIG. 13D, which is a magnified view of part of FIG. 13C) show a partly-split DVD'. As shown in FIGS. 13C and 13D, the corner of the blade has made the starter split and is being withdrawn. The handle is returning to "START" position, and the blade is still partly inside the disk. Considerable vertical space is present between the handle and the blade, allowing room for the upper half of the splitting disk to angle upwards (initial separation), curve over towards horizontal, and finally slip between the blade and the handle. After the DVD has been split, the operator uses the center hole to grasp and slide out the two disk halves.

Thus the invention provides for easily splitting a DVD (such as a 0.05" DVD) into two half-thickness disks ("half-disks"). Using the invention, a DVD may be split into two half-disks in as little as five seconds.

DVD disks that have been so processed into DVD disk halves may be run through a data destruction machine such as an exemplary inventive data destruction machine discussed herein with the "TOP" marked sides UP. It will be appreciated that the "TOP" (i.e., the exterior of the to-besplit DVD) is not the data-bearing surface. The declassification methods of the present invention may be applied to a DVD disk, in its split form. It further will be appreciated that whether a particular information-bearing disk is suitable for splitting before declassification may be determined from the construction of the disk (such as from the general appearance of the disk suggesting that it is a DVD, and/or the presence of a central seam on the disk edge or joint between the two halves, etc.). It will be readily appreciated that the reason for splitting a DVD is to expose the information-bearing surface so that the information-bearing surface may be contacted with a data-removing cutter according to the invention. Most preferably, both halves of a split-DVD are contacted with a data-removing cutter, even for a "single-sided" DVD, as information may stick to or be present on either surface after splitting.

Figure 2:
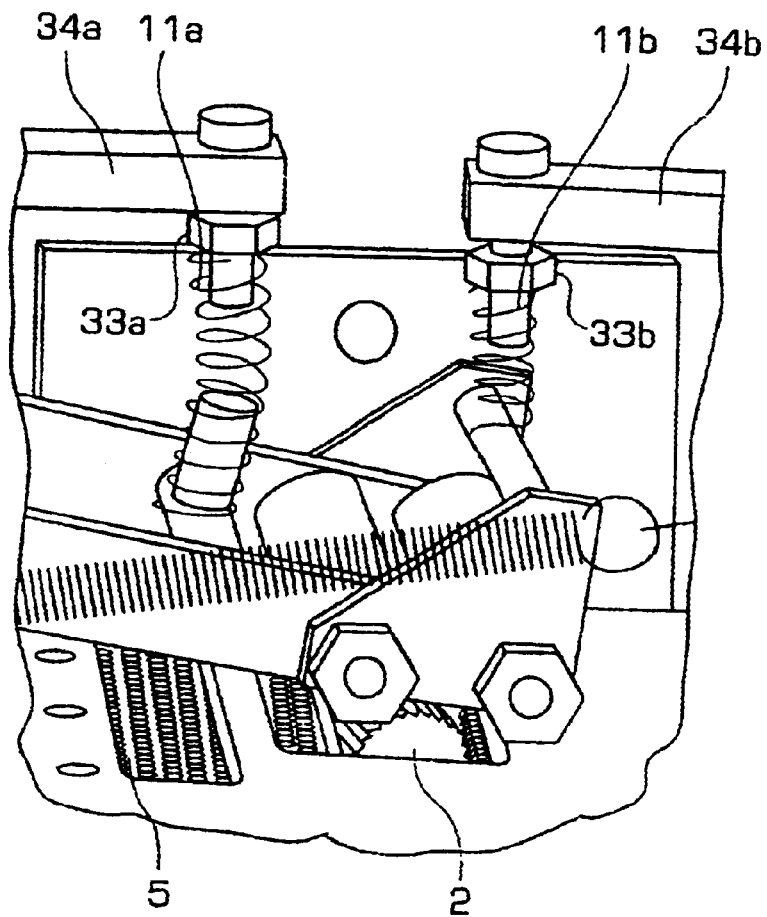
FIG. 2 shows an enlarged, partial detail view of the cutter and the parts around the cutter in a machine in which the cutter is used.
Figure 3:
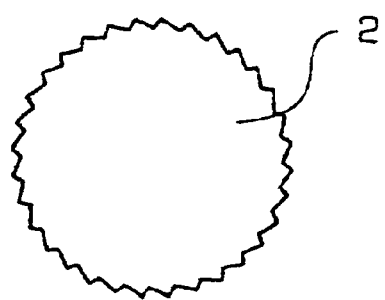
FIG. 3 is a profile view of the cutter.
Figure 4:
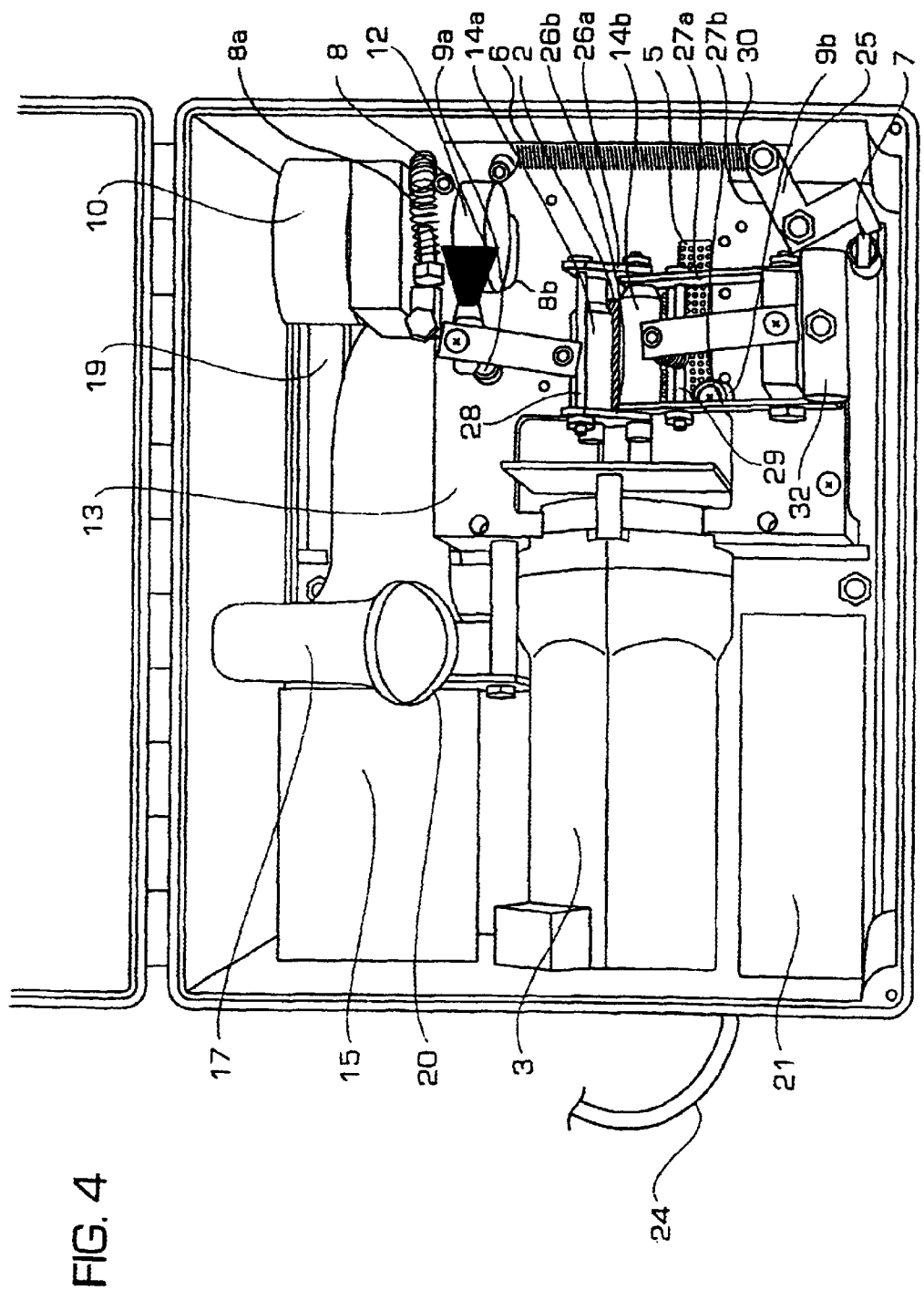
FIG. 4 is a fragmentary diagram of the interior of a partially-disassembled inventive machine in which the cutter of FIG. 2 is used and in which, for clarity of viewing, a vacuum bag is not included.

As for declassification according to the present invention, a preferred embodiment uses a cylindrical-shaped cutter, as in cutter 2 in FIGS. 2, 3, 4. In a preferred embodiment, as shown in FIG. 4, the cutter 2 rotation is provided by a motor 3.

The cutter surface is not necessarily limited, and may be an abrasive, rotary file, herring bone, cross-cut rotary file, intersecting spiral pattern, non-cross-cut interleave file, or other pattern. For providing these surfaces, a commercially available cutter from a machinery supply house may be used. The present inventor has experimented with some of these cutters and abrasives, and has found that non-cross-cut interleave works relatively well, but because of its helical shape tends to put a side force on the disk and tends to move the disk in or out. Preferably, the cutter should not load up with dust or partially-melted residue. The most preferred embodiment uses a cross-cut herring-bone pattern for the cutter surface. Such a cross-cut herring-bone patterned cutter may be made by purchasing part no. 60469665 from Manhattan Supply Corp. and then cutting its shank down to the desired length.

The cutter length should be equal to or exceed the length of the exterior data band, i.e., about 1.52 inches. When a commercially available cutter is used, the shaft may be cut and positioned as needed to align with the radial width of the exterior data band. If the cutter length is less than radial width of the exterior data band, one knowledgeable in the art will easily appreciate that complications would be introduced in that data destruction may not proceed properly. If the cutter swath is too much greater than the radial width of the exterior data band, the serial number-containing centerring undesirably may be destroyed. Having a longer-than-necessary cutter swath is to be avoided both to preserve the center-ring identification information and also to avoid unnecessary energy expenditure (and consequent heat build up) cutting away a part of the disk that does not require destruction. Thus, in the most preferred embodiment, the cutter length just exceeds the radial width of the exterior data band.

As to size, the cutter diameter may be about ½ inch, but is not required to be a particular diameter.

The cutter must be positioned with respect to the disk so as to effect disk declassification. The rotating cutter must be positioned sufficiently near to the disk so that the data will be removed by the action of the rotating cutter against the disk surface.

A vacuum system may be used for forcing the disk and rotating cutter together in sufficiently close contact.

"Speed" is the rate at which the cutter is rotating. The cutter typically is operated at about 10,000–30,000 rpm, which is a relatively high speed. That high-speed cutter rotation is provided by a motor. Such a speed translates into a certain number of cutting surface feet per minute. "Feed" is the rate at which the disk surface passes by the cutter.

It will further be appreciated that the cutter is rotating so as to help the disk to rotate. The cutter rotation augments the disk rotation, such that a reduced amount of force is required by the roller motor driving the disk.

At the high-speed motorized operation of the cutter, disk declassification is accomplished in as little as about 3–10 seconds.

In a preferred embodiment, the motor for driving the cutter may be run on a timing cycle. The timing cycle may be initiated by a microswitch 7 as shown in FIG. 4, which may be triggered by the to-be-processed disk.

In the declassification, the cutter must be positioned so as to come in contact with the disk surface so as, referring to FIG. 1, to mechanically remove the shiny top surface 1c and data area 1d and separate them from the inserted disk 1 being processed. The cutter is disposed in relation to the disk so that the disk center ring 1b is not removed.

The cutting operation comprises the application of the patterned cutter that is rotating to the data surface of a rotating disk.

During the cutting operation, one by-product is dust that is of a sufficiently small size to meet security declassification standards (hereinafter "dust"). The dust that is formed may be collected. Preferably, the dust is collected so that dust will not interfere with operation of moving parts.

Additionally, if the dust is collected in a disposable bag, there need be no operator contact with the dust. This is advantageous in that certain types of CDs or DVDs may contain dyes or other materials which might be hazardous for operators to contact or inhale.

Figure 5:
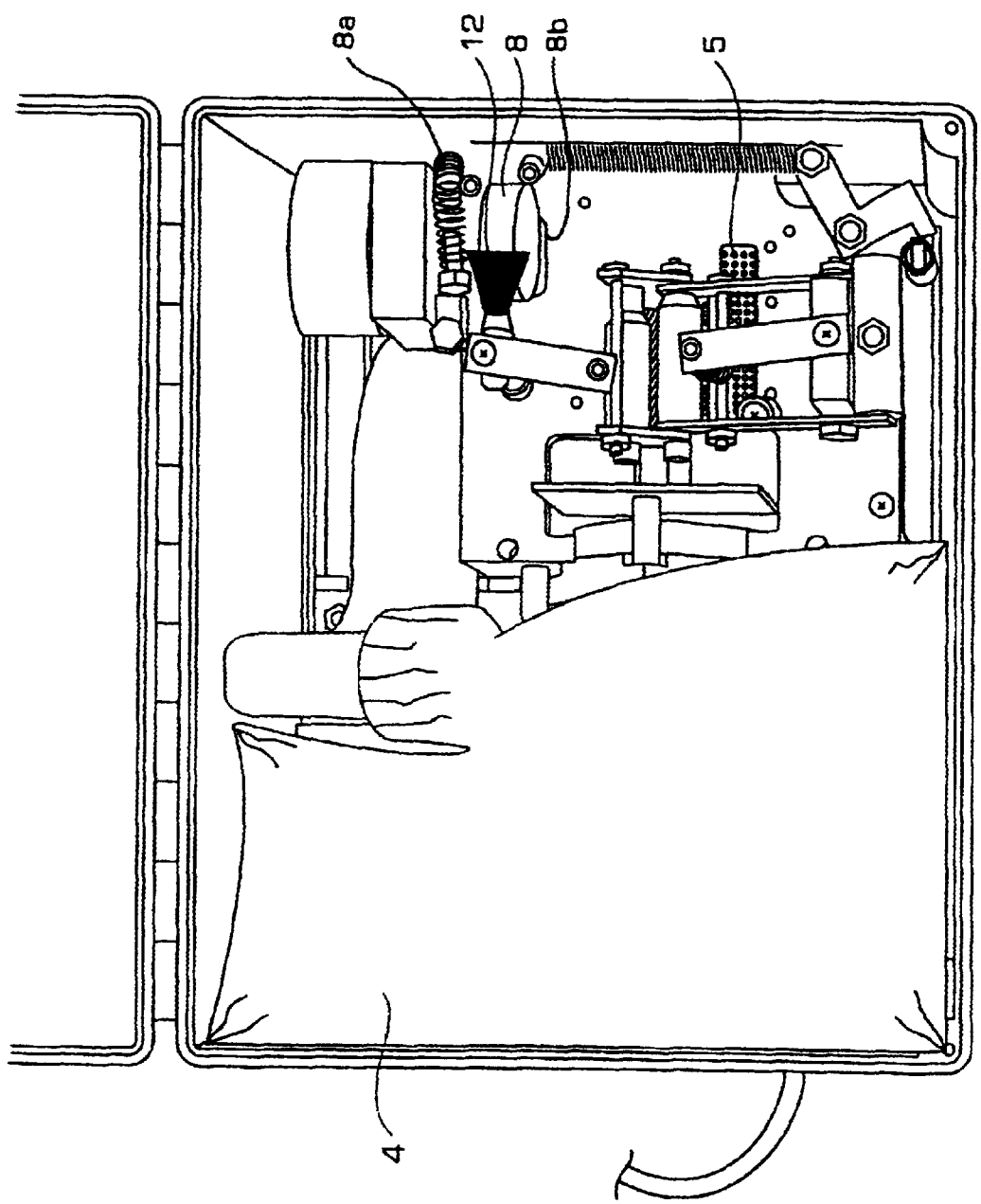
FIG. 5 is along the lines of FIG. 4, but with the vacuum bag added.
Figure 6:
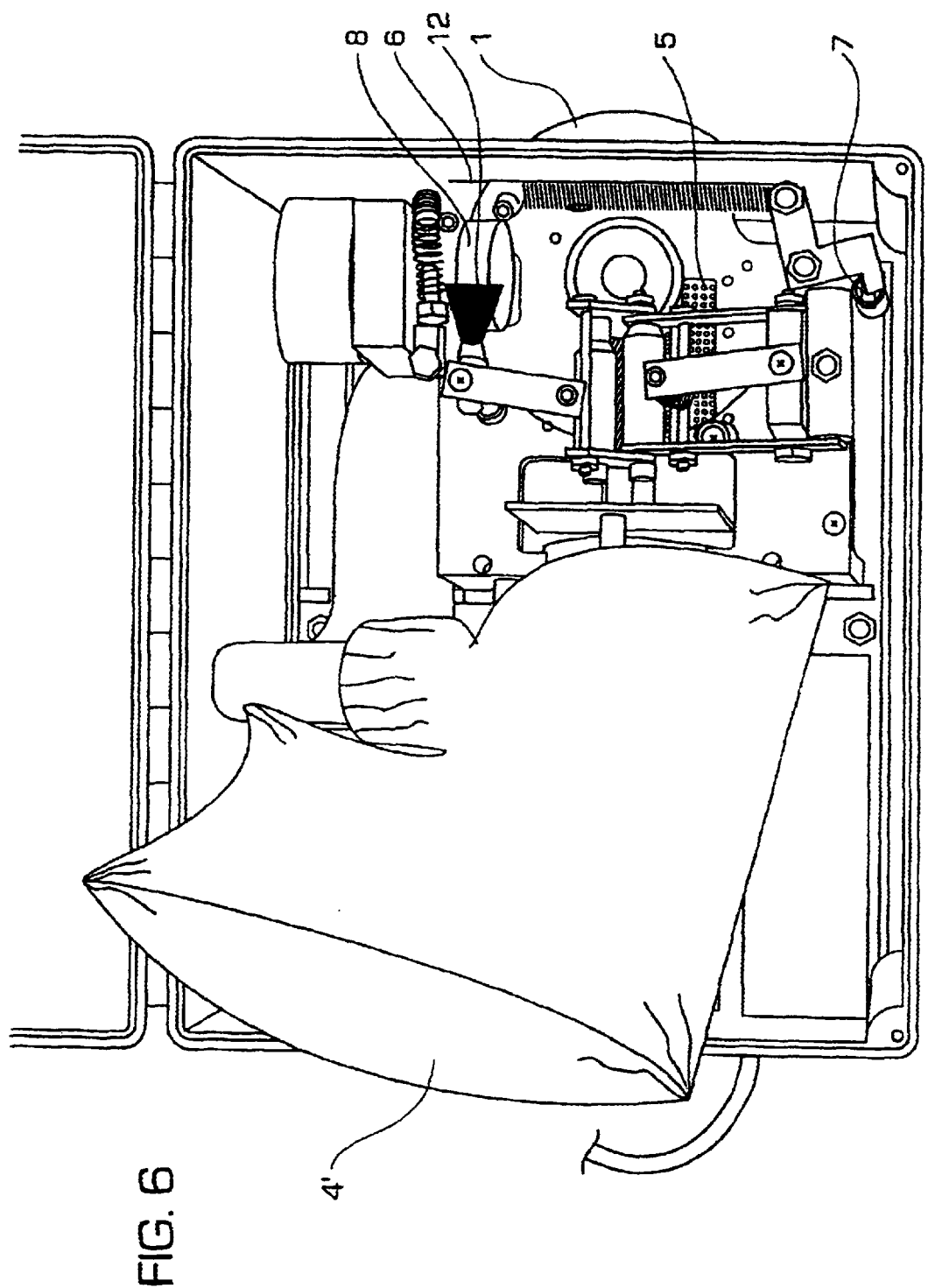
FIG. 6 is along the lines of FIG. 5, but with a CD inserted and the vacuum bag inflated during use of the machine.

In a preferred embodiment, as shown in FIGS. 5, 6 and 7, a vacuum dust collection system is used for dust collection. The vacuum dust collection may be operated simultaneously with the cutting operation. In the machine shown in FIG. 5, the dust created from the removal process is collected in vacuum bag 4.

Optionally, the vacuum bag may be a reusable fabric vacuum pouch.

During the cutting operation, in addition to dust formation, another byproduct that may form for certain types of disks is flakes which may not meet security declassification standards (hereinafter "flakes"). Flakes that may form require capturing and further destruction efforts, i.e., regrinding or re-cutting. Those in the art will appreciate that only certain types of disks may flake.

In a particularly preferred embodiment, importantly, the flake capturing system is as simple and integrated with the initial cutting operation as possible, so that no further parts, such as a separate re-grinder or re-cutting mechanism, are required.

To avoid clogging and to minimize the number of parts (with the corresponding concern about either requiring close fits or separate machinery) are features of the invention. Advantageously, the present invention for its flake capturing system and recutting, provides for reusing the precision high speed cutter.

The high speed cutter may be re-used for re-cutting the flakes by trapping the flakes by a carefully shaped screen.

The flake-capturing screen should have openings of sufficient size to permit the dust to pass through without clogging, but to prevent the flakes from passing. A suitable raw screen material for using is commercially available from McMaster-Carr, part no. 9360T21, which is about 0.018 inches thick. A suitable raw size for the screen is 3½ inches long by 3½ inches wide. The screen may be cut and formed as needed.

As shown in FIG. 7, the screen 5 may be positioned around and under the rotating cutter 2 so as to capture the flakes. The screen 5 is of ordinary brass, about 0.018 inches thick, and dead soft. Holes in the screen 5 are about 0.045 inches in diameter, closely spaced. In screen 5, the "open area" (i.e., the area comprised of holes) is about 50% of the total screen area. The screen 5 is used to prevent the flakes from leaving the area of the cutter 2 prior to re-cutting. Preferably, the screen 5 is disposed so that it gradually approaches the cutter 2, and at its closest point to the cutter 2, the cutter 2 clears the screen 5 by about 0.025 inches. The rotating cutter 2 should clear the screen 5 and not contact the screen 5, to provide for smooth mechanical performance. While a maximum closest distance between the screen 5 and cutter 2 is not exactly established, it will be appreciated that providing the smallest distance possible in a practical, economically manufacturable machine is generally advantageous for achieving the objective of minimizing the dimensions occupied by the screen 5 and cutter 2 and associated parts. Also, the closeness of the cutter 2 to the flake-capturing screen 5 enhances the ability of the rotating cutter 5 to pick up and carry the flakes via the spaces in the cutter's patterned surface.

In a preferred embodiment, such as one as shown in FIGS. 2, 4, 5 and 6 using flake-capturing screen 5, flakes generated from the cutting of the cutter 2 against the disk surface being processed travel so that they come into contact with and situate on and near the rotating cutter 2. Once a flake situates on the rotating cutter 2, such as in a space on the patterned surface of the cutter, the flake travels via the rotating cutter 2 back to the contact of the rotating cutter 2 and the disk surface, and the flake is drawn between the patterned cutter surface and the disk surface, and the flake is thereby cut down further.

It is not necessary that a flake travel on the rotating cutter 2 before re-cutting. Also, flakes that have separated from the disk surface directly may be drawn back through the air, without riding on the rotating cutter 2, to the juncture of the rotating cutter 2 and the disk surface and thereby re-cut into dust. Some of these rather fragile flakes may also be broken down simply by coming into air-borne contact with the high-speed cutter.

The movement of the flakes in returning for re-cutting between the rotating cutter 2 and disk surface may be assisted by a vacuum system, disposed to vacuum from below the screen.

Flakes that are re-cut into dust then travel, as dust, through the screen 5 (as does the originally produced dust). The patterned cutting surface parallel to the disk must be kept parallel to the disk, otherwise the cutter 2 may penetrate unevenly and leave gaps of data remaining on the disk.

Also, the patterned cutting surface must be brought into sufficient contact with the disk so that all of the data will be removed from the disk.

It will be appreciated that the inventive declassification processes described herein may be modified in various ways without departing from the spirit of the invention.

In one embodiment of the invention, the declassification process may be accomplished using a single-disk machine. The operation of the machine is first set forth and discussed with reference to FIGS. 4, 6, 8(a), 9, 10 and 11.

An unprocessed disk 1 is loaded into the single-disk machine through an opening 6 to trigger a microswitch 7. A suitable microswitch for use in the invention is the "SNAP-ACTION SWITCH". Other microswitches also may be used.

Figure 11:
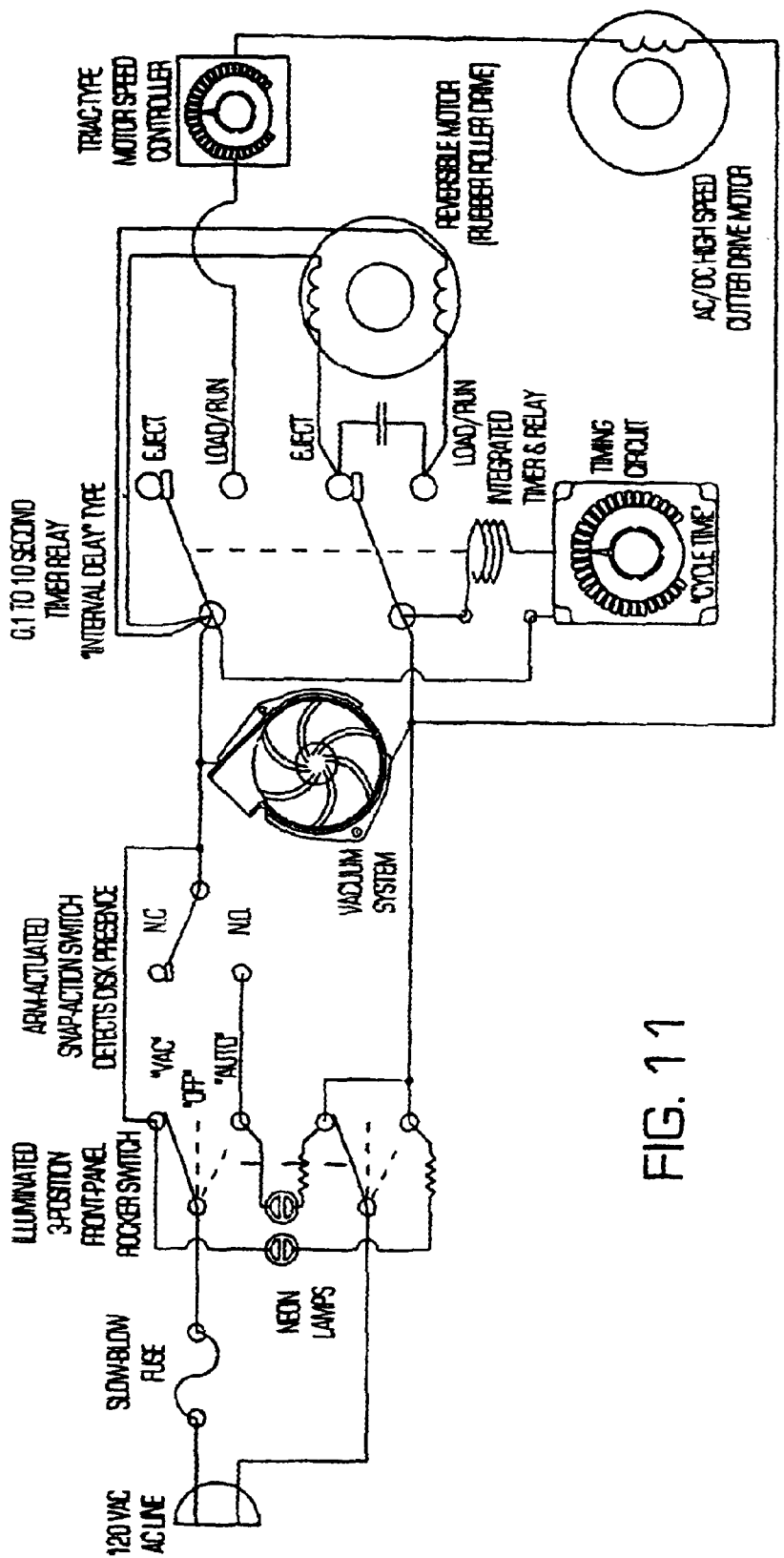
FIG. 11 is a circuit diagram.

The triggering of microswitch 7 starts a timing cycle. A circuit as shown in FIG. 11, including such a timing cycle, may be used. A timing relay 21 (shown in FIG. 4) may be used inside the machine, and the timing relay 21 may be controlled by an exterior timing knob (shown in FIG. 8(b)) on the outside of the machine.

In the preferred embodiment of the single-disk machine, the disk is drawn into the machine when a spring-loaded pinch roller mechanism, which comprises a pressure roller or pinch roller 8 riding on a big ball bearing 8b(shown on FIG. 5), pinches the inserted to-be-processed disk 1 and pulls it into the machine. The pinch mechanism is driven by a first motor 10. Thus, the roller mechanism functions first to draw the disk into the machine. Once the disk has been drawn into the machine, the roller mechanism keeps rotating the disk.

The motor 10 driving the pinch mechanism starts at the same time as a second motor 3 which drives a cutter or grinder 2. Although most simply, both motors start at the same time, such simultaneous starting of the motors is not necessary. The motors are started automatically by insertion of the disk after switching ON the exterior on/off switch 23 (shown in FIG. 8(a)). Power is supplied via power cord 24 (shown in FIG. 4).

The pinch roller/motor combination mentioned above and shown in the figures has THREE functions using only ONE mechanism: (1) to draw the partially inserted disk into position for cutting; (2) to rotate the disk to cause the cutter/grinder to sweep the entire data band; and (3) to eject the declassified disk from the machine. These aspects of the invention are innovative, economical, and provide maximum simplicity, considering that the machine is fully automatic.

Minimizing the number of motors needed is advantageous, in several perspectives, including reducing the number of parts and thereby simplifying the machine, minimizing the weight, and minimizing the dimensions.

As part of the mechanism for capturing the inserted disk, a pivot may be provided with a non-rotating guidepost at the bottom of the pivot. The guidepost is exactly across from the center of the roller. Disk capture is facilitated by passing the guidepost.

The to-be-processed disk upon being fully inserted into the machine is positioned against ball bearings. In a preferred embodiment of the invention, as shown in FIG. 4, there are three ball bearings 9a, 9b and another that is not visible in FIG. 4 and is under the actuator 25. The ball bearings 9a, 9b and the third ball bearing are positioned in a triangle, with the third ball bearing positioned on a pressure arm, which captures the disc 1 to position the disc for holding and rotating. The three ball bearings define where the disc center 1b is ultimately located. This machine makes use of the fact that disks necessarily are uniform and circular for operation in normal use for data retrieval devices.

Figure 9:
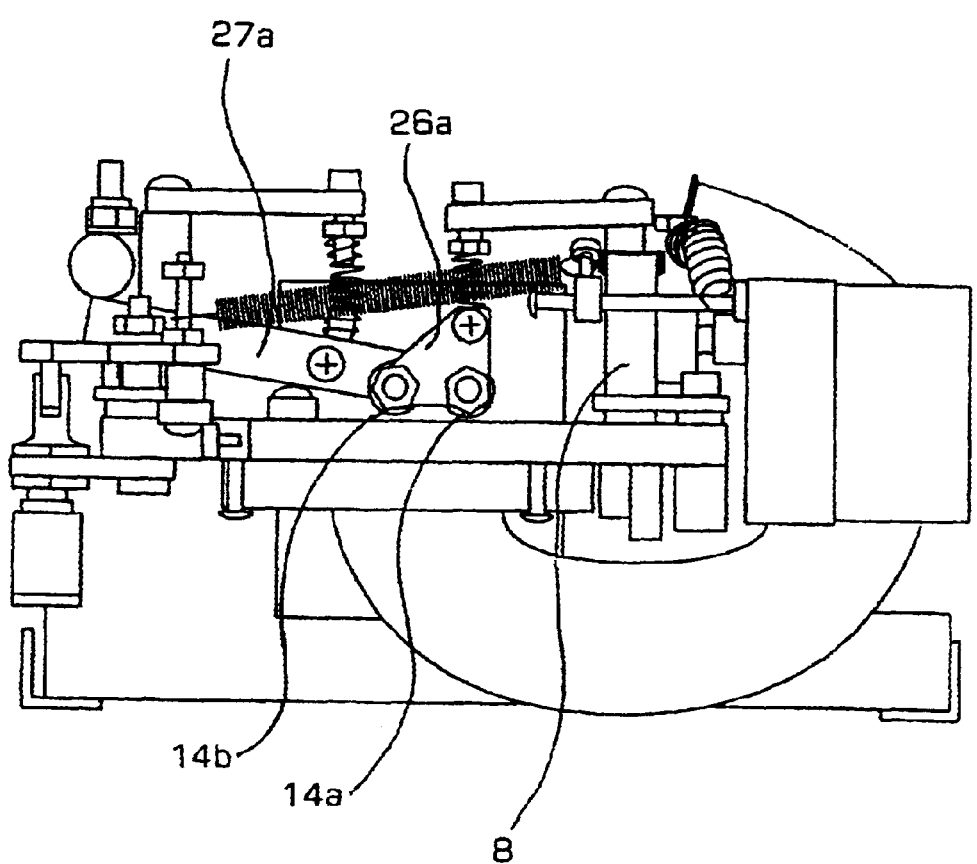
FIG. 9 is a front view of the mechanism of FIGS. 4, 5 and 6 removed from the cabinet.
Figure 10:
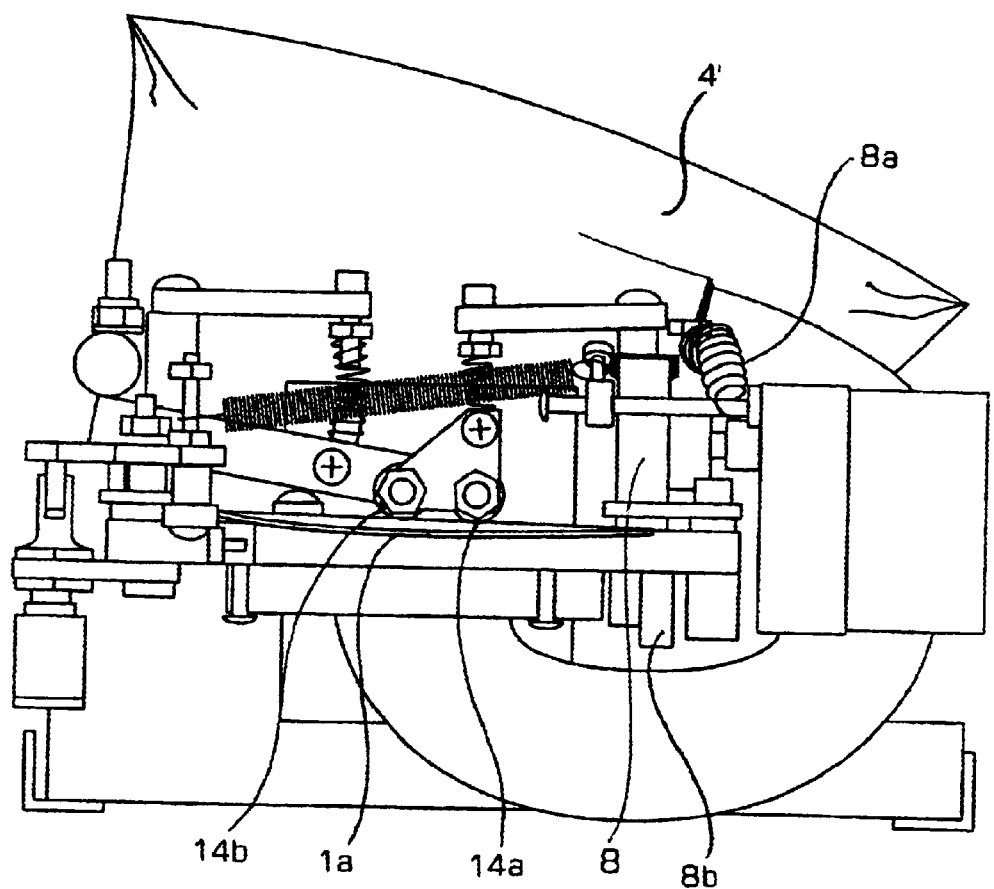
FIG. 10 is the same side view as FIG. 9, with a CD inserted and the vacuum bag inflated during use.

In the machine shown in FIGS. 9 and 10, the positioning and capturing of the disk are further accomplished by the following features.

A pivot is provided, with a guidepost at the bottom of the pivot. The guidepost does not rotate and is geometrically located with the guidepost exactly across from the center of the roller. By passing the guidepost, the disk is partially captured.

In a preferred embodiment, the time cycle is set for 2 revolutions of the disk. Other numbers of revolutions, such as 1, 3, 5 or other numbers of revolutions may be used. Providing 2 revolutions is believed to be the best combination of low heat and reasonable performance. In actual practice, for example, the machine might be adjusted at the factory so as to perform the required security function in one revolution, yet have its timer set for two revolutions, to provide an extra margin of safety. Advantageously, the user will only want the data destruction machine to run as long as necessary.

In using a machine as shown in the figures, the pinch roller 8 operates until the disk no longer remains in the machine to contact the switch actuator arm.

The ejection of the disk from the machine may be accomplished by the use of a circuit as in FIG. 11. Using that circuit, when the time cycle ends, the main (cutter) motor 3 shuts down and the roller (pinch) motor 10 reverses, causing the disk to exit the machine. This occurs partly because upon conclusion of the timed cycle, drag on the disk during deceleration of the cutter motor 3 makes exiting of the disk easier.

Optionally a front swing actuator arm spring 30 (shown in FIG. 4) can be set to fling the declassified disk completely out of the machine. This feature advantageously enables the fastest possible processing of a plurality of disks, which could be very important in an emergency.

As set forth above, it will be appreciated that the data destruction machine may be used to have three phases of operation, including disk insertion, disk rotation for a certain time, and disk exiting.

During operation of the data destruction machine, cutting proceeds such that the shiny top surface 1c and data area are removed and separated from the inserted disk 1. The center ring 1b is not removed.

For accomplishing the cutting operation, and removing the top surface 1c and data area from the disk 1, the machine provides the cutter 2.

For positioning the respective parts of the machine 2 in a reduced-space configuration, two pressure springs 11a and 11b may be used, as shown in FIG. 2.

The disposition of the high-speed drive motor 3 for the cutter 2 may be accomplished by using, for attachment, a collet.

In a preferred embodiment, the whole roller motor pivots as a unit to allow for wear on the pinch roller 8 (which rotates the disk) and changes in temperature. The workings of the pinch roller may be appreciated from FIG. 10, in which pinch roller 8 is above and contacts disk 1 under which is a ball bearing 8b. The ball bearing freewheels during the cutting operation, and the pinch roller 8 moves. Those in the art are familiar with pinch rollers. A ball bearing was used in a preferred embodiment because it is precise and long-wearing, but alternatives may be used, such as bushings.

A brush 12 as shown in FIGS. 4, 5 and 6 is provided to brush from the pinch roller 8 dust that otherwise accumulates during operation.

For providing sufficient contact between the disk and the rotating cutter, in the embodiment shown in FIG. 7, a leading tension roller 14a and a following tension roller 14b are used for forcing the disk 1 against the rotating cutter 2. Each tension roller is floppily mounted on two independent bars 26a and 26b, and 27a and 27b, respectively, with an arm pivot 28 and 29, respectively, provided for each tension roller. There is a lower limit for how far down the tension rollers 14a and 14b can be pushed. The tension roller system conforms the disk to the cutter surface that it must contact, and acts as a pressure equalization/leveling device and also as the limit device. A vertical-limit-setting nut and equalizer bar are provided as part of the tension roller system.

The tension rollers 14a and 14b spin when on the disk surface. To permit such spinning, in mounting the tension roller to each arm, a loose, floppy mount is provided. Using a tension roller assembly is preferred and provides several advantages. First, the tension roller self-aligns to force the disk evenly against the rotating cutter. This allows for normal machine assembly without ultra-precision fits, tolerances, or adjustments. Second, the tension roller provides a balanced downward limit. The tension roller stays parallel as it descends to the lower limit. The limit bar allows this level limiting with one part, i.e., one adjustment for the two arms. Third, the tension roller is pushed down by a spring. The spring force is adjustable by a screw or nut. The spring position is adjustable by pivoting the spring arm mount, thus adding more or less tension roller pressure toward the center or edge of the disk as necessary. Fourth, the use of a second tension roller helps to mold the disk, which is slightly flexible, over the cutter, enhancing cutting efficiency and speed. Fifth, the use of the second tension roller also suppresses vibration of the disk, which otherwise could cause it to bounce away from the cutter.

A pinch force spring 8a (as shown in FIGS. 4 and 10) may be provided to apply downwards pressure to the motor frame and to increase the pressure between the pinch roller 8 and the disk. In one embodiment, a moveable nut can be provided to decrease or increase the pressure of the pinch force spring 8a. However, in another embodiment, spring pressure may be a non-adjustable feature.

With wear, a pinch roller becomes smaller. Accordingly, being able to change pinch rollers is an advantage. The machine provided herein provides for easy replaceability of the pinch roller.

During the cutting operation, the disk sits on a support platform 13 (shown in FIG. 4) which is a flat surface.

During the cutting operation, dust is formed. The dust, being sufficiently small-sized, as shown in FIG. 7, passes through the flake-capturing screen 5 and travels in the vacuum dust collection system into a dust collection bag 4. A vacuum system may be provided, including an intake system, a discharge system and an auxiliary system. For gathering the dust before its vacuuming, as shown in FIG. 7, a dust collector cup 16 may be provided below the screen 5, with the bottom of the cup 16 going through a hose 18 to vacuum intake (not shown on FIG. 7)

During the cutting operation, in addition to dust, flakes may be formed and require capturing. In a preferred embodiment, the flake capturing system is as simple as possible, so as to avoid the need to provide and drive a separate re-grinder or re-cutter, to avoid clogging, and to avoid providing more parts requiring close fits. Advantageously, the present invention for its flake capturing system and re-cutting reuses the precision high speed cutter 2. The flakes get trapped by a screen 5 which is positioned under the rotating cutter 2. The screen prevents the flakes from leaving the area of the cutter 2. The flakes come into contact with and situate on the rotating cutter and thus, when that point on the cutter next contacts a disk surface, the flake is further cut down in size. Once the flakes are reduced to dust, they travel as does the originally produced dust in the dust collection system into the dust collection bag 4.

In a data destruction machine such as that shown in FIG. 4, keeping the disk in cutting position is accomplished by tension rollers 14a and 14b and a balancing mechanism. When actual cutting is proceeding, the tension roller mechanism helps to keep the disk in contact with the cutting surface.

The machine configuration shown in FIGS. 2 and 4–10 addresses, inter alia, the important requirements of: keeping the cylindrical cutting surface absolutely parallel to the disk so that the cutter 2 will penetrate sufficiently and data gaps will not be left; keeping the disk in flat, direct contact with the roller line and avoiding angular contact so that data gaps will not occur; avoiding bounce problems by forcing the disk in contact with the rest of the roller, using the flexibility of the disk itself.

The machine in the embodiments mentioned above advantageously has minimal mechanisms. However, it will be easily appreciated that mechanisms can be added to the machine.

The declassified disk that exits the machine has its center ring 1b intact, but has been stripped of its shiny top surface 1c and data area. The top surface 1c and data area have been converted to dust and material consistent with security declassification standards from which data cannot be recovered.

Providing a data destruction method whereby the center ring 1b remains after destruction of the data on the disk is significant. Typically, the center ring does not contain data but does contain a serial number by which the disk may be identified and controlled. Typically, security personnel responsible for controlling a disk on which was contained sensitive data will want to be able to have direct evidence that the particular disk with the particular serial number in question has been declassified.

In a preferred embodiment, an optional, detachable vacuum attachment is provided, for vacuuming from inside the machine dust that may have accumulated. During vacuuming using the optional vacuum accessory, the cutter is not operating. The optional vacuum accessory may make use of the vacuum system that already is provided as part of the vacuum dust-collection system. The optional on-board vacuum connection may include a hose and a small nozzle adapter. The life and proper mechanical functioning of the declassification machine may be enhanced by such optional further vacuuming.

Also as to dust control, filters may be provided for the motors (such as the cutter or vacuum motor) used in a declassification machine according to the invention, by providing filters over the air inlets of the motors, to prevent dust from entering the motor.

The invention provides for at least one disk to be inserted into a declassification machine. It will be appreciated that two or more discs may be loaded simultaneously, using multi-disk loading technology, including an auto-loader and unloader accessory.

When using a machine where the cutter is provided below the CD being declassified, it will be appreciated that the disk should be inserted data-side down into the machine, so that the data surface may be mechanically removed. The declassification machine (referring to FIG. 8(a)) may be switched on using the on/off switch 23 before, as or after a disk is inserted into the opening 6.

The power requirements of a machine in which the cutter motor 3, vacuum motor 15 and pinch roller motor 10 (in FIG. 4) as mentioned above are used is 100–130 vac 60 Hz, 3.7 amperes/445 watts, which provides relatively low power consumption. The declassification machine is pluggable into a wall outlet. Also, an emergency DC converter accessory may be provided to run on a 75 ampere-hour vehicle battery. In such a case, approximately 1900 disks may be declassified on a fully charged 75 ampere-hour, 30-lb. vehicle battery. A lighter-weight battery will provide destruction energy for a commensurate number of disks.

The motorized declassification machine and method are power-failure safe, in that in the event of loss of electrical power, the disk can be pulled out manually.

The declassification methods and machines according to the invention are simple to use for an unskilled operator, even under high stress conditions.

The sound level may be about 83 dB, A Scale, at 24 inches from the front disk slot (in a worst case position), which is comparable in sound level to a small vacuum cleaner. Such a sound level is quiet enough for an office environment.

The declassification methods and machines according to the invention are environmentally safe, in making a cool powder that is thought to be harmless, and is easily discarded or emptied. High temperatures are not used.

A declassification machine according to the invention is simple to use, like a CD player. Opening doors or drawers is not needed. Pushing buttons is not needed. Operating latches, catches, levers, hasps or the like is not needed. A machine according to the invention may be provided without exposed moving parts.

A declassification machine according to the invention is fully automatic and may be easily turned on for use, and the disk to be declassified inserted. The machine may be left on indefinitely or accidentally, and only the neon pilot light (using extremely low energy) remains on.

A machine according to the invention also advantageously may eject the disk and turn itself off.

In making a declassification machine according to the invention, in a preferred embodiment, the size and weight of the machine are minimized as much as possible. To accomplish such minimization, and to minimize the size and weight of a high-speed CD-disk declassification motorized machine to as small as about 8 inches by 10 inches by 12 inches and as light as about 17 pounds, while still providing a machine that outputs a verifiable center-ring-intact declassified CD, production may proceed as follows, with reference to FIGS. 4, 6, 8(a).

Figure 8A:
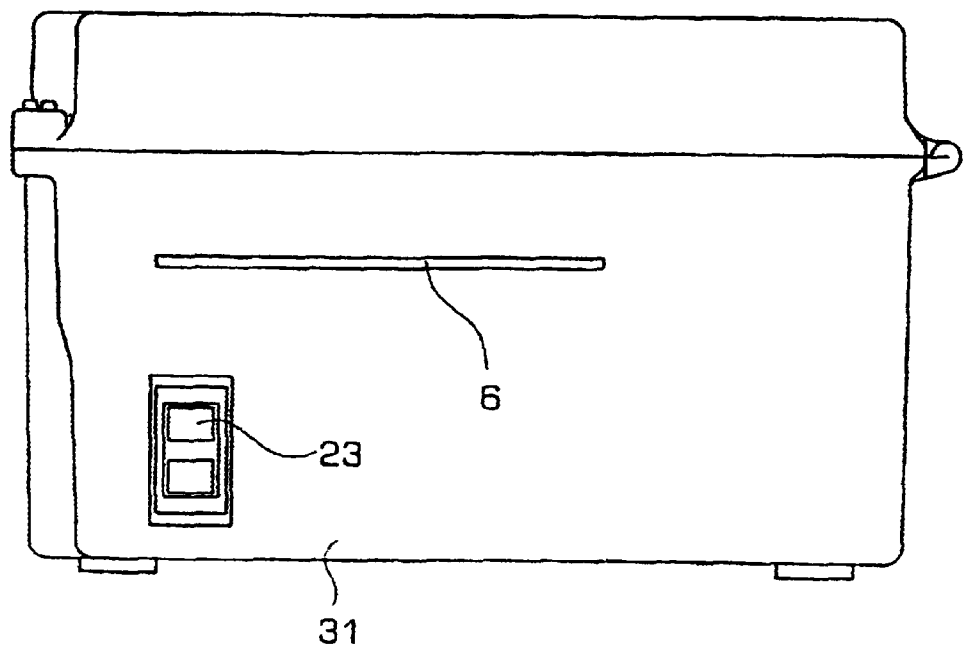
FIGS. 8(*a*) and 8(*b*) are exterior side-views of a desk-top machine according to the invention, for accomplishing high-speed, high-security disk erasure, with FIG. 8(*a*) showing the front of the machine and FIG. 8(*b*) showing the rear.
Figure 8B:
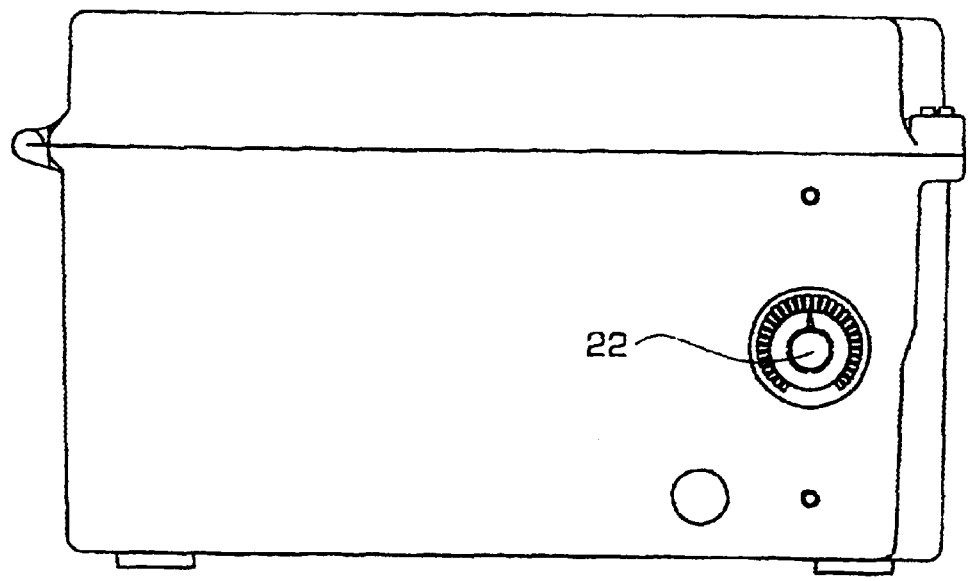

As shown in FIG. 8(a), a housing 31 of about 8 inches high, with a base of about 10 by 12 inches, may be provided. The housing 31 may be an NEMA 4× Fiberglass sculptured, gasketed enclosure. An opening 6 into which a CD or split DVD may be inserted is provided on a side of the housing.

Reference may be made to FIG. 4 for an example of how parts of the CD or split-DVD declassification machine may be disposed.

More particularly, in the housing interior, a system for capturing and positioning a CD or split-DVD is securely disposed, such that the capturing/positioning system is secured to the housing base.

To the capturing/positioning system is mechanically connected a system for disposing a patterned-surface cutter 2 of length about 1.52 inches, with the cutter parallel to and below where the CD or split-DVD will be held by the capturing/positioning system for cutting, with the cutter length aligned with the disk radius.

To the cutter 2, a motor 3 is connected for rotating the cutter at 10,000–30,000 rpm. To the cutter motor 3, a power cord 24 is connected for establishing connection to an external power source, such as for plugging into a wall outlet.

The disk capturing/positioning system may comprise a support platform 13 of about 6 inches wide by 5½ inches long for supporting the disk (such as a CD or split-DVD) during high-speeding cutting. The disk support platform 13 has a cut-out section (as seen with reference to FIG. 7) for the cutter 2 under the disk to contact the CD or split-DVD data surface. Preferably the size of the cut-out section in the support platform 13 is minimized to be no greater than needed for the rotating cutter 2 to contact the disk surface. The disk support platform 13 in FIG. 4 is secured to the housing using support frame 19.

A microswitch system is included in the declassification machine shown in the figures, and comprises a microswitch 7 actuated by actuator arm 25 positioned (as in FIG. 6) with respect to the opening 6 into which the CD or split-DVD is inserted to detect entry of a CD or split-DVD into the housing.

The microswitch 7 is electrically connected to a timing circuit, and the timing circuitry is disposed in the housing interior.

In the inventive declassification machine shown, a motorized vacuum dust collection system is disposed in the housing interior. The motorized vacuum dust collection system comprises a vacuum motor 15 separate from the cutter motor 3. The motorized vacuum dust collection system comprises a dust collection bag 4 (as shown in FIG. 5 when the machine is not operating and in FIG. 6 when the machine is operating) connected (with reference to FIG. 4) to a vacuum exhaust 17. The vacuum exhaust is connected to a vacuuming device directed to vacuum dust from where the cutter 2 contacts the CD or split-DVD. The vacuum bag 4 in a preferred embodiment slips tightly onto a tapered rubber nipple 20 at the vacuum intake 17.

The capturing/positioning system may be made using a motorized pinch roller system. The pinch roller 8 (with reference to FIG. 4) is positioned above and in close contact with the CD or split-DVD. A motor 10 separate from the cutter motor 3 and separate from the vacuum motor 15 is provided for operating the pinch roller.

For minimizing dust build-up on the pinch roller 8, a brush 12 is disposed above the pinch roller 8 with the brushing end contacting the pinch roller 8.

A flake-capturing screen 5 is shaped and positioned under the cutter 2 and close to the cutter without contacting the cutter and also under the disk support, and to completely block access by flakes to the vacuum intake.

For positioning the respective parts in a reduced-space configuration, two pressure springs 11a and 11b (as shown in FIG. 2) may be used in the disk positioning system.

In a preferred embodiment, all rotating components are disposed on permanently sealed, high-quality ball bearings.

Figure 12:
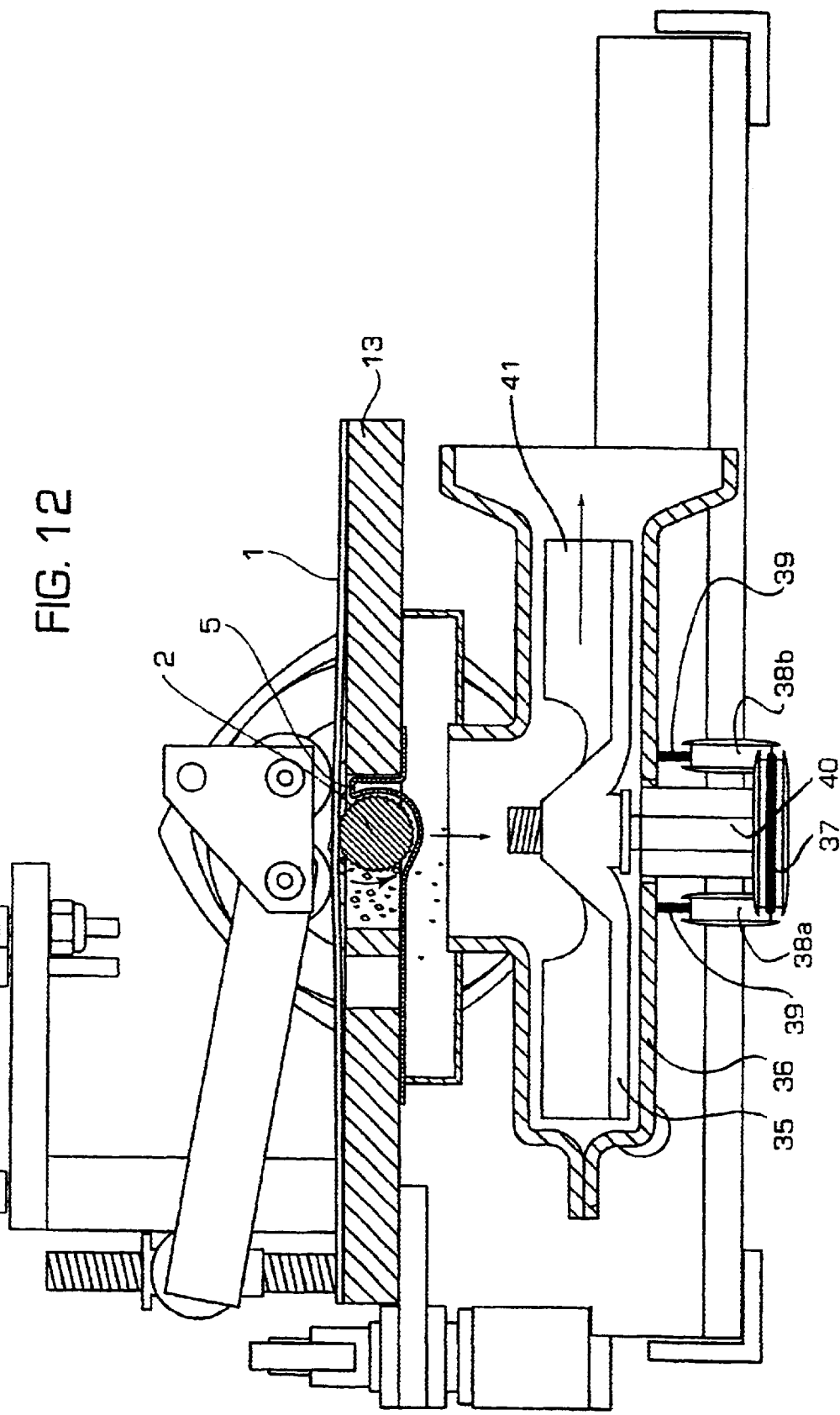
FIG. 12 shows a vacuum belt drive system in which a single motor drives both the cutter and the vacuum system.

In a preferred embodiment of a machine according to the invention, as shown in FIG. 12, the vacuum system is driven from the main cutter motor, to provide a two-motor declassification machine. Advantageously, such a system reduces the number of separate motors needed.

In such an embodiment, the cutter motor drives the vacuum impeller 35 (referring to FIG. 12), which essentially is a centrifugal fan. The impeller 35 is in the impeller housing 36. The vacuum system is mounted below the main support platform 13, with the shaft axis vertical. A pulley (not shown in FIG. 12) is provided on the main cutter motor, a pulley 37 is provided on the vacuum impeller shaft 40. Two additional pulleys 38a and 38b are mounted on the frame to allow the belt 39 to turn the corner and couple the motor pulley (not shown) to the vacuum impeller pulley 37. Pulley diameters are sized to provide the vacuum impeller speed needed. Collected dust travels through a hose 41 and up to a bag (not shown in FIG. 12). Such a two-motor machine, by eliminating a third, separate vacuum motor, further reduces weight, cost, noise, power consumption and heat buildup within the housing. A two-motor machine according to this embodiment may be lighter than 17 pounds.

In another embodiment of a two-motor machine, the vacuum system is positioned close to the front disk slot, so that the impeller shaft pulley can be driven by a belt directly from the main motor shaft. A vacuum collection cup is provided, with a hose from the vacuum collection cup to the vacuum intake. The dust travels in the vacuum exhaust to a collection bag, as in the three-motor machine mentioned above.

An autoloader may be provided for feeding disks into the declassification machine.

Uncontrolled efforts to split a DVD may damage the DVD and result not in DVD half-disks but in DVD fragments that may be difficult or impossible to process with a rotating cutter (or any other acceptable means). Where DVDs are to be declassified by a data destruction machine, it will be appreciated that splitting of the DVDs to ready them for contact with a rotating cutter according to the invention preferably is accomplished in a controlled manner. Thus, where a rotating-cutter-containing data destruction machine is intended for use with DVDs, preferably a DVD splitter device is provided therewith, such as mechanically connected to the data destruction machine, most preferably detachably connected.

INVENTIVE EXAMPLE 1

A single-disk data declassification machine using a cylindrical herring bone cutter purchased from Manhattan Supply Corp. (part number 60469665) with shank slightly shortened was operated on 15 CD-ROM disks, 15 CD-WO disks and 15 CD-RWs at a time setting of no less than 8.5 seconds and a speed setting of approximately 20,000 rpm for each disk tested. After operation, declassified CDs remained, along with dust in the micron range.

INVENTIVE EXAMPLE 1-A

The inventive machine produced residue from the CD-ROM disks containing approximately 3.2% of the total weight in oversized particles with the remaining residue being consistent with security destruction standards. Evaluation of the oversized particles revealed that, due to heat created by friction of the initial cutting action or reduction in the secondary chamber, smaller particles were melting together, forming "remelt" particles. Further evaluation of these oversized particles revealed that no data could be retrieved. The machine therefore met the U.S. government standard for the secure routine destruction of classified and sensitive CD-ROM media.

INVENTIVE EXAMPLE 1-B

The machine produced residue from CD-WO (CD-R) disks containing approximately 8.6% of the total weight in oversized particles with the remaining residue consistent with the security destruction standard. Evaluation of these oversized particles revealed that they consisted of "remelt"

and metal foil. After further evaluation of both of the "remelt" and metal foil oversized particles, it was determined that no data could be retrieved. Therefore, the machine met U. S. government standards for the secure destruction of CD-WO media.

INVENTIVE EXAMPLE 1-C

The machine produced residue from CD-RW disks containing approximately 8.6% of the total weight in oversized particles with the remaining residue consistent with the security destruction standard. Evaluation of these oversized particles revealed that they consisted of "remelt" and metal foil. After further evaluation of both the "remelt" and metal foil oversized particles it was determined that no data could be retrieved. The machine therefore met U.S. government requirements for secure destruction of CD-RW media.

As a result of the testing, the machine may be characterized as "Meets DoD Standard for CD Destruction Devices".

It will be appreciated that the above information is not intended to be limiting and that modifications may be made without departing from the spirit of the invention.

What I claim is:

1. A DVD splitter system, comprising:
    a housing with a circular nest of diameter only slightly larger than a DVD diameter, the nest having a height of about half the thickness of a DVD; and
    a blade attached to the housing; including mechanical contact with a rotating cutter-containing apparatus.

2. The DVD splitter system of claim 1, including a writing marker.

3. The DVD splitter system of claim 1, the mechanical contact being detachable.

4. A method of exposing data in the middle portion in the axial direction of a DVD, comprising:
    a step of splitting a DVD of thickness $2t$ into two disk-shaped halves each of thickness t.

5. The method of claim 4, wherein the splitting consists of the DVD being subjected to application of splitting force at the rim thickness midpoint.

6. The method of claim 5, wherein the force application consists of application of a blade.

7. The method of claim 5, wherein during force application, the DVD is situated in a holding device.

* * * * *